(12) United States Patent
Has et al.

(10) Patent No.: US 8,634,731 B2
(45) Date of Patent: Jan. 21, 2014

(54) METHOD FOR AUTOMATICALLY CONTROLLING THE SEQUENCE OF PROCESSING ORDERS FOR PROCESSING MATERIAL CONTAINERS

(75) Inventors: Michael Has, Erding (DE); Helmut Weiner, Munich (DE)

(73) Assignee: Océ Printing Systems GmbH, Poing (DE)

( * ) Notice: Subject to any disclaimer, the term of this patent is extended or adjusted under 35 U.S.C. 154(b) by 242 days.

(21) Appl. No.: 13/148,697

(22) PCT Filed: Feb. 9, 2010

(86) PCT No.: PCT/EP2010/051541
§ 371 (c)(1),
(2), (4) Date: Aug. 10, 2011

(87) PCT Pub. No.: WO2010/094593
PCT Pub. Date: Aug. 26, 2010

(65) Prior Publication Data
US 2011/0311287 A1    Dec. 22, 2011

(30) Foreign Application Priority Data

Feb. 18, 2009  (DE) .................. 10 2009 009 540
Feb. 18, 2009  (DE) .................. 10 2009 009 541

(51) Int. Cl.
*G03G 15/00* (2006.01)
*G03G 21/00* (2006.01)
*G03B 27/46* (2006.01)

(52) U.S. Cl.
USPC ................. 399/43; 399/24; 358/1.15

(58) Field of Classification Search
USPC ....................................... 399/24, 43
See application file for complete search history.

(56) References Cited

U.S. PATENT DOCUMENTS

| | | | |
|---|---|---|---|
| 4,745,440 A * | 5/1988 | Kono et al. ............ 399/27 |
| 5,187,520 A * | 2/1993 | Muller et al. ............ 355/72 |
| 5,853,171 A * | 12/1998 | Halpenny ............ 271/126 |
| 6,219,502 B1 * | 4/2001 | Osari et al. ............ 399/82 |
| 6,650,443 B1 | 11/2003 | Izumi |
| 6,882,812 B2 * | 4/2005 | Kasahara et al. ............ 399/120 |
| 6,976,798 B2 | 12/2005 | Keane et al. |
| 2001/0043365 A1 | 11/2001 | Kremer et al. |
| 2002/0131075 A1 | 9/2002 | Kremer |
| 2004/0006522 A1 | 1/2004 | Keane et al. |
| 2004/0211330 A1 | 10/2004 | Clark et al. |
| 2004/0260741 A1 | 12/2004 | Plessier |
| 2005/0044550 A1 * | 2/2005 | Perdu ............ 718/105 |
| 2005/0276618 A1 | 12/2005 | Clement et al. |
| 2007/0086024 A1 | 4/2007 | Kremer et al. |

(Continued)

FOREIGN PATENT DOCUMENTS

| | | | | |
|---|---|---|---|---|
| DE | 10123488 A1 | 11/2001 | | |
| JP | 2007163716 A * | 6/2007 | | |
| JP | 2008123166 A * | 5/2008 | ............ G03G 21/00 |
| WO | 0155869 A1 | 8/2001 | | |

*Primary Examiner* — Nguyen Ha
(74) *Attorney, Agent, or Firm* — Schiff Hardin LLP

(57) ABSTRACT

In a method or system for automatic controlling of jobs to be processed, the jobs to be associated with input and output material bundles, the jobs to be processed are collected into multiple groups or clusters. The groups or clusters are automatically sorted according to rules. The input material bundles are fed to a processing device at a central station, at least one post-processing apparatus being connected to and down stream from the processing device.

10 Claims, 15 Drawing Sheets

(56) References Cited

U.S. PATENT DOCUMENTS

2008/0075488 A1* 3/2008 Moriyama et al. .............. 399/43
2008/0297843 A1* 12/2008 Aoki ............................ 358/1.15
2009/0033979 A1 2/2009 Morales et al.
2009/0080022 A1* 3/2009 Tsutsumi .................... 358/1.15
2009/0207447 A1 8/2009 Keane et al.

* cited by examiner

METHOD FOR AUTOMATICALLY CONTROLLING THE SEQUENCE OF PROCESSING ORDERS FOR PROCESSING MATERIAL CONTAINERS

BACKGROUND

The preferred embodiment concerns a method to automatically control the order of processing jobs for processing material bundles. In particular, the preferred embodiment concerns a method to automatically control the order of print jobs for execution at a printing device. The preferred embodiment furthermore in particular concerns a method to automatically control the order of print jobs for processing of material webs of predetermined bundle processing length.

For example, the processing jobs can be executed by means of material webs of predetermined web length that are supplied to input rolls, wherein segments of different lengths can be processed in the individual processing jobs and the processed segments of the material webs can be rolled up on output rolls, and the processing jobs are to be distributed to multiple material webs.

Processing jobs with which segments of material webs that are of different length are processed typically occur in high-capacity printing systems in which the material webs are supplied to the printing device on rolls and the processed material webs are wound again on rolls.

The individual processing jobs are conventionally executed in the order as they arrive at the printing station. An operator can manually modify the order of the print jobs. This is appropriate if specific print jobs should be processed with a specific type of material web and other print jobs should be processed with a different type of material web.

An optimization of the processing that goes beyond this is not known.

SUMMARY

It is an object to achieve a method for processing jobs to be processed at a processing device with a central station and multiple post-processing apparatuses, which method achieves a very efficient processing of the processing jobs.

In a method or system for automatic controlling of jobs to be processed, the jobs to be associated with input and output material bundles, the jobs to be processed are collected into multiple groups or clusters. The groups or clusters are automatically sorted according to rules. The input material bundles are fed to a processing device at a central station, at least one post-processing apparatus being connected to and down stream from the processing device.

DESCRIPTION OF PREFERRED EMBODIMENTS

Figure 1:
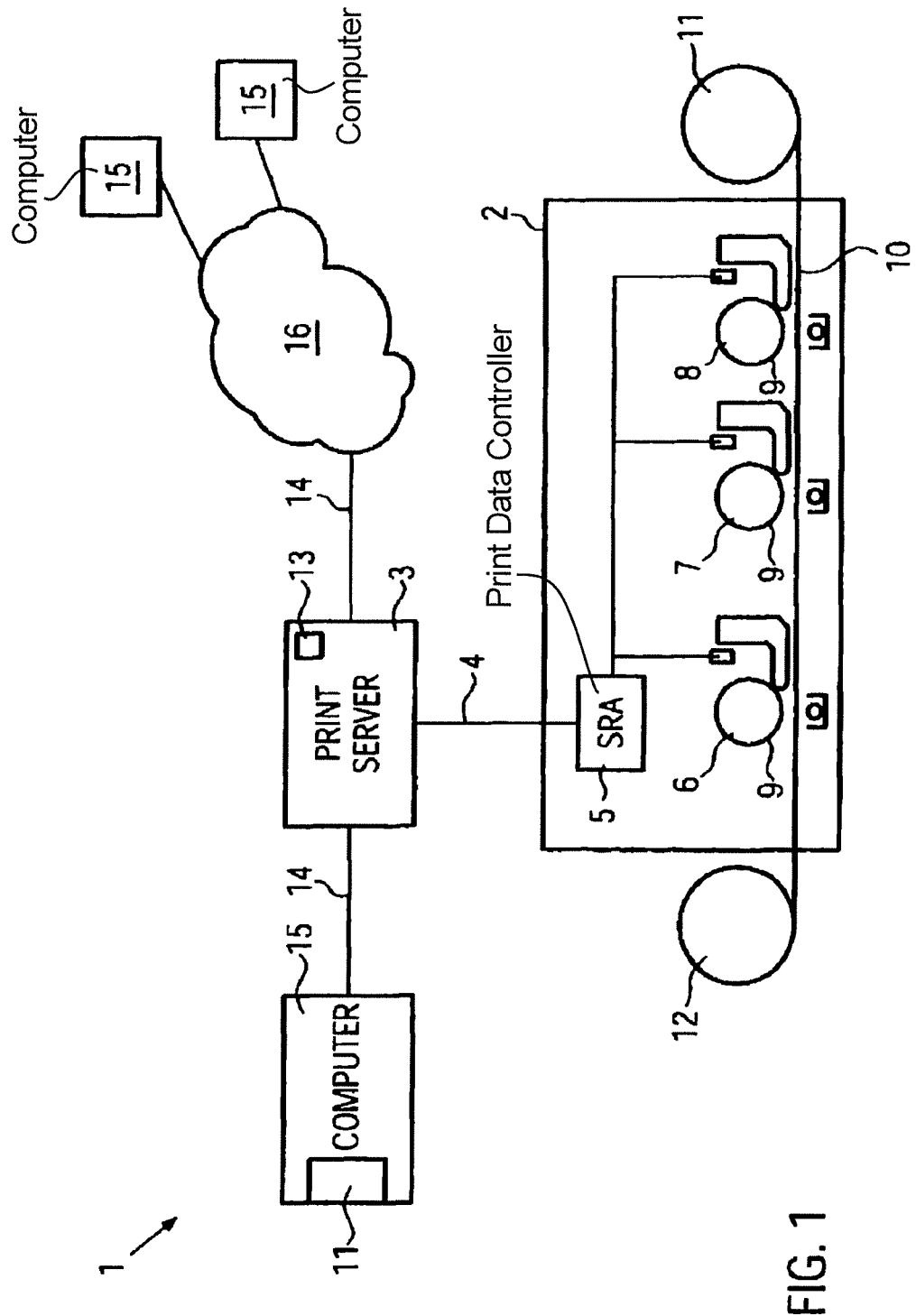
FIG. 1 illustrates schematically a printing system to execute the method according to the preferred embodiment.

For the purposes of promoting an understanding of the principles of the invention, reference will now be made to preferred embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included.

In a method according to a first embodiment, the order of processing jobs for processing of material bundles is controlled automatically, wherein the processing jobs are executed in a distributed manner at multiple material bundles, and before and during the processing the material bundle is supplied to input bundles of a processing device, wherein the processing of the material bundle takes place at a central station and at multiple post-processing apparatuses downstream of the central stations, and before the processing the processing jobs are collected into multiple groups or clusters, wherein the groups or clusters are sorted automatically according to predetermined rules.

According to this first embodiment, the processing jobs are collected into groups and/or clusters before being supplied to the processing device, and these groups or clusters are then sorted.

This first embodiment is also described in the German Patent Application Nr. 10 2009 009 540.3 by the applicant, the content of which is herewith incorporated by reference into the present Application.

The automatic collection of processing jobs into groups or clusters already allows an efficient utilization of the processing device because the processing jobs are collected into the groups or clusters corresponding to predetermined properties, for example, such that they can be executed in succession without changeovers and without refitting times at the processing device. According to the first embodiment, the processing jobs collected into groups or clusters are sorted. With the sorting of the groups or clusters the workflow can be very efficiently adapted to the characteristics of the processing device. If the processing device comprises a printing device, the different post-processing devices normally have very different throughputs and refitting times. Via the sorting of print jobs collected into groups the post-processing devices can be utilized very efficiently and the refitting times can be kept low.

However, adaptations to other framework conditions of the workflow, for example the inventory of the material to be processed or of the available stock for the processed material, are also possible.

The processing jobs of a group or of a cluster are advantageously sorted according to properties that are specific to the association with one of the post-processing apparatuses, such that the processing jobs of a group or a cluster are respectively executed at a specific post-processing apparatus.

The order for execution of the groups can in particular be established such that the post-processing apparatuses are optimally utilized.

One or more of the following rules is advantageously applied to sort the cluster of groups:

the groups are sorted depending on the throughput of the post-processing apparatuses, wherein the post-processing apparatuses are utilized uniformly with groups of processing jobs and more groups of document processing jobs are associated with the post-processing apparatuses that have a higher throughput, groups with similar document processing jobs are sorted so as to follow one another so that the number of refitting processes is low and/or the number of transmitted groups of document processing jobs that are processed by a post-processing apparatus that is to be refitted is reduced depending on the necessary refitting time in order to not cause a backup at this post-processing apparatus, the order of the individual groups is determined depending on their content, and—in particular if a group contains one or more document processing jobs that contain an urgency notation—the priority of the group in the order of the groups is determined depending on the urgency notation and/or the number of urgency notations, the groups of document processing jobs are sorted depending on inventories of the unprinted recording materials and/or the printed products, wherein a high inventory of a specific type of recording material is executed with priority, and given a high inventory of a specific product the group of document processing jobs that lead to the generation of the product is sorted with low priority in the series in order to not unnecessarily increase the inventory.

The sorting in particular takes place in groups. A group advantageously contains so many processing jobs that, given its execution, a material bundle is essentially exhausted so that the control of the order of the groups of the processing jobs takes place synchronously with the supply and discharge of the material bundle.

Before the formation of groups the processing jobs are advantageously sorted automatically into predetermined classes using relevant properties. The groups can thereby respectively be formed within the respective classes.

According to one embodiment of the invention, the material bundle is a material web, the input bundle is an input roll, the output bundle is an output roll and the bundle processing length is a web length, wherein the material web on the input roll is supplied to the processing device and is rolled up on the output roll after the processing.

In another embodiment of the invention the material bundle is a bundle stack of sheets of predefined number and predetermined size, the input bundle is an input stack, the output bundle is an output stack, and the bundle processing length is a bundle length across all sheets of the bundle stack, wherein the bundle stack is supplied to the processing device as an input stack and is stacked up as an output stack after processing.

The preferred method embodiment according to the invention is advantageously designed for automatic control of the order of print jobs.

An additional embodiment of the invention that can be viewed in combination or also independent of the previously described embodiments concerns a method to automatically control the order of processing jobs to process material bundles of predetermined length that are supplied on input rolls or in the form of predefined stacks, wherein segments of different length can be processed in the individual processing jobs and the processed segments of the material bundles are collected into output bundles. The processing jobs are thereby sorted in groups such that, at the end of one group, the input bundle and output bundle can be simultaneously exchanged as often as possibly with only little spoilage. Downtime at the processing device can hereby advantageously be spared.

According to this embodiment of the invention it was recognized that—given processing of material webs of predefined web length that are supplied on input rolls, wherein segments of different length can be processed in the individual processing jobs and the processed segments of the material web are rolled up on output rolls—a significant potential exists to optimize the required labor cost and material cost automatically in that the order of the processing jobs is controlled automatically so that the input rolls and the output rolls are exchanged optimally simultaneously at the printing device. Both rolls can hereby be exchanged simultaneously in a single halt of the printing device.

The processing jobs are in particular distributed to multiple material bundles, and during the processing the material bundles are supplied as input bundles to a processing device, wherein segments of different length are processed in the individual processing jobs and the processed segments of the material bundle are collected into output bundles. Before the processing the processing jobs are collected into multiple groups so that the entire length of the segments of the processing jobs of each group (which is designated as a group length in the following) lies in a range between a desired length and the bundle processing length for multiple groups, and the desired length is smaller by a predetermined threshold than the bundle processing length. Given a group for which no group length can be determined in a range between the desired length and the bundle processing length, an additional processing job is subdivided into a first and a second partial processing job such that the segment of the first partial processing job corresponds to the difference from the processing bundle length and the group length and is added to the group as a last processing job, and the second partial processing job is added to an additional group as a first processing job that is executed following the group with the first partial processing job. The processing jobs of each group are executed in succession, and given group lengths whose length amounts to at least the desired length, the input bundle (with which the material bundle has been supplied to process these processing jobs) and the output bundle (in which the processed material bundle is collected) are exchanged simultaneously.

The last cited embodiment is also described in German Patent Application Nr. 10 2009 009 541.1 originating from the applicant, the content of which is herewith incorporated by reference into the present Application.

In the event that a regular proportion of spoilage occurs in a processing method, this can be taken into account in the determination of the threshold. For example, if it is known from experience that a certain proportion of pages is to be reprinted, the threshold can then be reduced or a proportion of bundle processing length can be left out of consideration in the association of processing jobs so that an automatic reprinting of incorrect pages at the excess material can take place. This can in particular be automated in connection with an expert system that estimates the potential spoilage using one or more parameters. For example, it is known that very thin paper always causes a certain spoilage in printing.

For example, a high speed digital printing device requires 40 minutes for the printing of a paper web wound on an input roll. The swapping of the input roll takes approximately 10 to 15 minutes. The swapping of the output roll takes approximately 5 to 8 minutes. The roll at the output side is typically exchanged after a first print job with a duration of approximately 20 minutes. The printing device was halted for this. If the roll at the input side is consumed, the printing device must be halted again. Every stoppage of the printing device costs valuable machine time.

With the embodiment the processing jobs can be automatically controlled in an order so that the input rolls and the output rolls can be simultaneously exchanged as often as possible. This principle according to the embodiment can also be applied to all types of materials that are supplied in predefined quantities (in particular predetermined lengths) to a processing apparatus, for example sheets to be printed in a printing machine that are supplied in stacks with a predetermined count and a established size of the sheets.

According to one advantageous exemplary aspect of the last cited embodiment of the invention, multiple associations of processing jobs are determined for a group, and a remainder of bundle processing length minus the group length is calculated for each association. The association thereby in particular takes place with the least remainder of the group when the group length is between the desired length and the bundle processing length. Multiple associations can thereby be determined in that, after the determination of an association of document processing jobs, the last gapless sequence of the document processing jobs of the association is canceled and a new association is determined insofar as that additional suitable document processing jobs are present. The output rolls are normally exchanged given a roll processing after the conclusion of each processing job. However, it is also possible to wind multiple processing jobs on an output roll. Given a processing job that extends across two groups, the exchange of the output roll then takes place either at the start or at the end of this processing job, and the exchange of the input roll takes place at the end of the material web of the input roll.

Since the processing jobs are collected in multiple groups whose total length corresponds at most to the web length or is slightly smaller, the input rolls and the output rolls are often exchanged simultaneously. Since the total length of the groups for the most part is greater than the desired length, only a small spoilage of web material is also generated, which respectively amounts only to the length difference between the web length and the total length of the individual groups.

In another development of the present preferred embodiment, multiple associations of processing jobs are determined for a group and a remainder of web length minus the group length is calculated for each association, wherein the association is associated with the smallest remainder of the group when the group length is between the desired length and the web length.

The determination of multiple associations advantageously takes place such that, after the determination of an association of document processing jobs, the last gapless sequence of the document processing jobs of the association is canceled and a new association is determined insofar as additional suitable document processing jobs are present.

In another development of the preferred embodiment, the collection of the material webs in groups takes place via the following Steps:
a) sort the processing jobs according to their size,
b) select the largest available processing jobs and associate these processing jobs with a group,
c) add the largest available processing job that still fits on a material web to this group,
d) repeat Step c) until no additional processing job that can be associated with the group is available, wherein the group length is not greater than the web length,
e) check whether the group length is greater than or equal to the desired length and, if this is the case, an additional group of processing jobs is generated according to Steps a) through d) in the event that processing jobs are still present that are not associated with any group, and
in the event that the group length is smaller than the desired length, one or more processing jobs are removed from the group and replaced by multiple processing jobs that are all smaller than the longest removed processing job.

Given the removal of a processing job from the group when the group length is smaller than the desired length, the following Steps can be executed:
a) remove the two last associated processing jobs,
b) add the next smallest processing job (relative to the largest of the two removed processing jobs),
c) check whether free processing jobs can still be added to this group so that they still fit on a material web, wherein if this is possible the next largest free processing job is added, and if this is not possible then Steps a) through c) are repeated, wherein a processing job is subdivided if it is established in Step a) that no smaller processing jobs are present.

To collect the material webs into groups, the total length of all processing jobs can initially be determined and a minimum number of output rolls can be determined using the total length.

A group can be provided for each output roll, and initially one of the longest processing jobs can respectively be associated with one of the groups.

According to the following method, the remaining processing jobs can be distributed to the groups using the following Steps:
a) sort the remaining processing jobs according to their size,
b) select the largest processing job and associate this processing job with a group,
c) add the next largest processing job that still fits on the material web to this group,
d) repeat Step c) until no additional processing job that can be associated with the group is available, wherein the group length is not greater than the path length,
e) associate additional processing jobs with additional groups according to Steps a) through d) in the event that processing jobs that are not yet associated with a group are present.

In a further advantageous exemplary embodiment of the invention, different sets of groups are generated by means of systematic transposition of the order, advantageously with a lexicographical order. For each set of groups a cost measure can thereby be calculated, and the set with the smallest cost measure can be selected. Furthermore, a selection of larger processing jobs can thereby initially be associated with the groups with a heuristic method. For example, as a cost measure it can be provided that:
a material value that results from the differences between the bundle length and the respective group lengths multiplied by a material cost factor, and
a work value that results for the individual exchange of an input bundle, the individual exchange of an output bundle and the joint exchange of the input bundle and the output bundle, multiplied by corresponding standing cost factors are added together.

Before the association of processing jobs with groups, all processing jobs that are longer than a bundle processing length can advantageously be subdivided into: one or more processing jobs that are respectively one bundle processing length long; and one shorter processing job.

The collection of the processing jobs into multiple groups can take place with different methods, in particular the Monte Carlo method, a backtracking method or a heuristic, or can take place with an arbitrary combination of these methods.

In the Monte Carlo method and in the backtracking method different orders of the processing jobs are determined and these are respectively assessed with a cost measure, wherein the order with the lowest cost measure is selected. In the heuristic an order of the processing jobs is determined according to a predetermined algorithm and this is then applied.

Combinations of the backtracking method, the Monte Carlo method and heuristic methods can also be used. For example, it can be appropriate to initially distribute long processing jobs uniformly to the groups by means of a heuristic and then to determine multiple orders of the processing jobs in that the shorter processing jobs are distributed in a different manner to the individual groups by means of the Monte Carlo method. A selection of the most suitable order subsequently takes place in turn by means of a cost measure.

The halt time or down time of the processing apparatus and the spoilage of a material web that is caused with the method according to the preferred embodiment are taken into account in the calculation of the cost measure.

In particular, with the last cited embodiment of the invention processing jobs can advantageously be processed at a processing device with predetermined length of a central station and multiple post-processing apparatuses, and the required labor cost and the spoilage that it is hereby incurred can thereby be kept low.

FIG. 1 shows a digital, electrophotographic printing system 1 that is suitable to execute the method according to the preferred embodiment. This printing system 1 comprises a printing apparatus 2 and a print server 3 to which the printing apparatus 2 is connected by means of a data line 4, via which data line 4 the data (for example of documents) to be printed are transferred. In the printing apparatus 2 the data line 4 ends at a Scalable Raster Architecture (SRA) print data controller 5 that rasters the print jobs or document data into individual pixels. The rastered print data are supplied to the three print groups 6, 7, 8 at which they generate a latent image on a photoconductor drum 9. Three different colors can be printed with the three print groups. The electrostatic images that are created in this manner are then electrophotographically developed with toner in a known manner and transferred to the recording material 10.

The recording material 10 is a paper web that is rolled out from an input roll 11 and rolled up on an output roll 12.

The present preferred embodiment is suitable both for single-color highlight color printing and for full color printing. In particular, the present preferred embodiment is suitable for digital printing, which in particular comprises electrophotographic printing methods and inkjet printing methods.

The print server 3 has a computer program unit (software) 13 that is designed to execute a method according to the preferred embodiment and executes the method when it runs on the print server 3. For this the print server has known means, for example a working memory (RAM) in which the software 13 is loaded; and input/output interfaces with which necessary input data (print job data, for example) and control data (the threshold c, for example) are supplied to the software 13; and a microprocessor that controls the workflow of the software program and calculates or establishes corresponding control variables for the method.

The print server 3 is connected with data lines 14 with one or more computers 15 and/or via the Internet 16 with additional computers 15 by which print jobs are generated. The print jobs are supplied to the print server 3 via the data line 15.

According to the preferred embodiment, the print jobs are sorted by the computer program unit 13 present in the print server 3 so that their order is optimized in relation to the assignment and the material spoilage at the printing apparatus 2.

Using FIGS. 2-7 the preferred embodiment is explained by means of an example with only 10 print jobs. In practice the count of 10 print jobs is less realistic. However, such few print jobs can be graphically depicted more simply, which is why such a low number of print jobs has been selected for the explanation.

Figure 2:
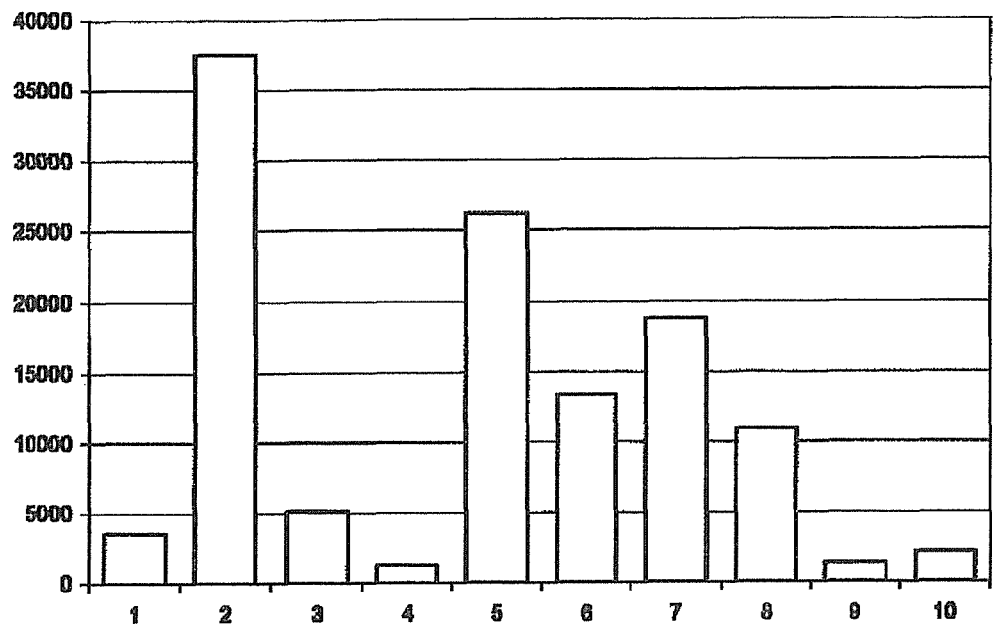
FIG. 2 illustrates 10 print jobs with their size in a histogram.

The size of the print jobs is specified in clicks. For example, a click corresponds to a length of 12 inches or 30.48 cm. In the following the unit is omitted in the specification of the size of the print jobs. The 10 print jobs have the sizes of 3,519, 37,528, 5,139, 1,169, 26,269, 13,326, 18,778, 10,873, 1,338 and 2,108 (FIG. 2). The sum of all sizes is 120,047.

An unused input roll has a paper web with a length of 40000. The length of the paper web of unused input rolls is designated as a web length in the following. At least four input rolls 11 are required in order to be able to execute the present print jobs.

Figure 3:
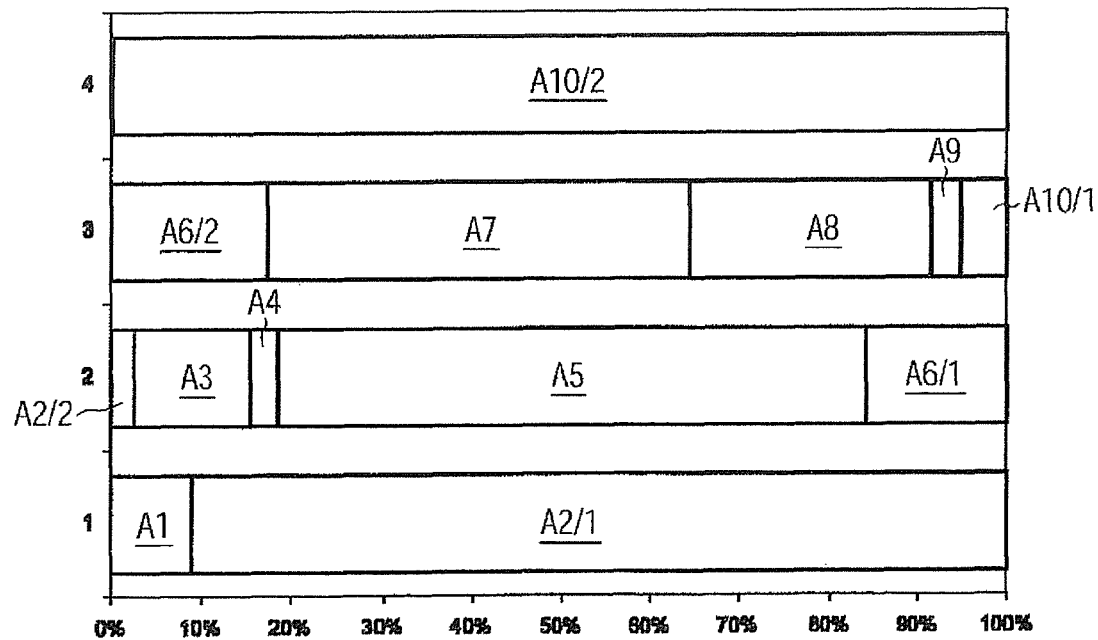
FIG. 3 shows a conventional order of the print jobs from FIG. 2.

Given the execution of the print jobs in the random order present according to FIG. 2, the order shown in FIG. 3 results, wherein the print job A1 is printed first, then a segment of the print job A2/1 is printed, and then the input roll 11 is to be exchanged. The print job A2/2 is subsequently printed to completion and the print jobs A3, A4, A5 and a first part of the print job A6/1 is printed. A second part of the print job A6/2 is printed when the second input roll 11 has been exchanged. The print jobs A7, A8, A9 and a first part of a print job A10/2 are subsequently printed. A second portion of the print job A10/2 is printed when the third input roll 11 has been exchanged. After conclusion of each print job, the printing apparatus 2 is halted to exchange the output rolls 12. The total time loss or the total halt time G of the printing apparatus 2 is thus:

$$G4 \times E + 10 \times A,$$

wherein E is the necessary halt time to exchange the input rolls 11 and A is the necessary exchange time to exchange the output rolls 12. Normally the exchange of the input rolls lasts longer than the exchange of the output rolls. Typical values are 10 to 15 minutes for E and approximately 5 to 8 minutes for A, for example. The threading of the web is more complicated than the extraction. In the workflow shown in FIG. 3, the total halt time of the printing apparatus is thus 90 minutes (with E=10 min and A=5 min).

Figure 4:
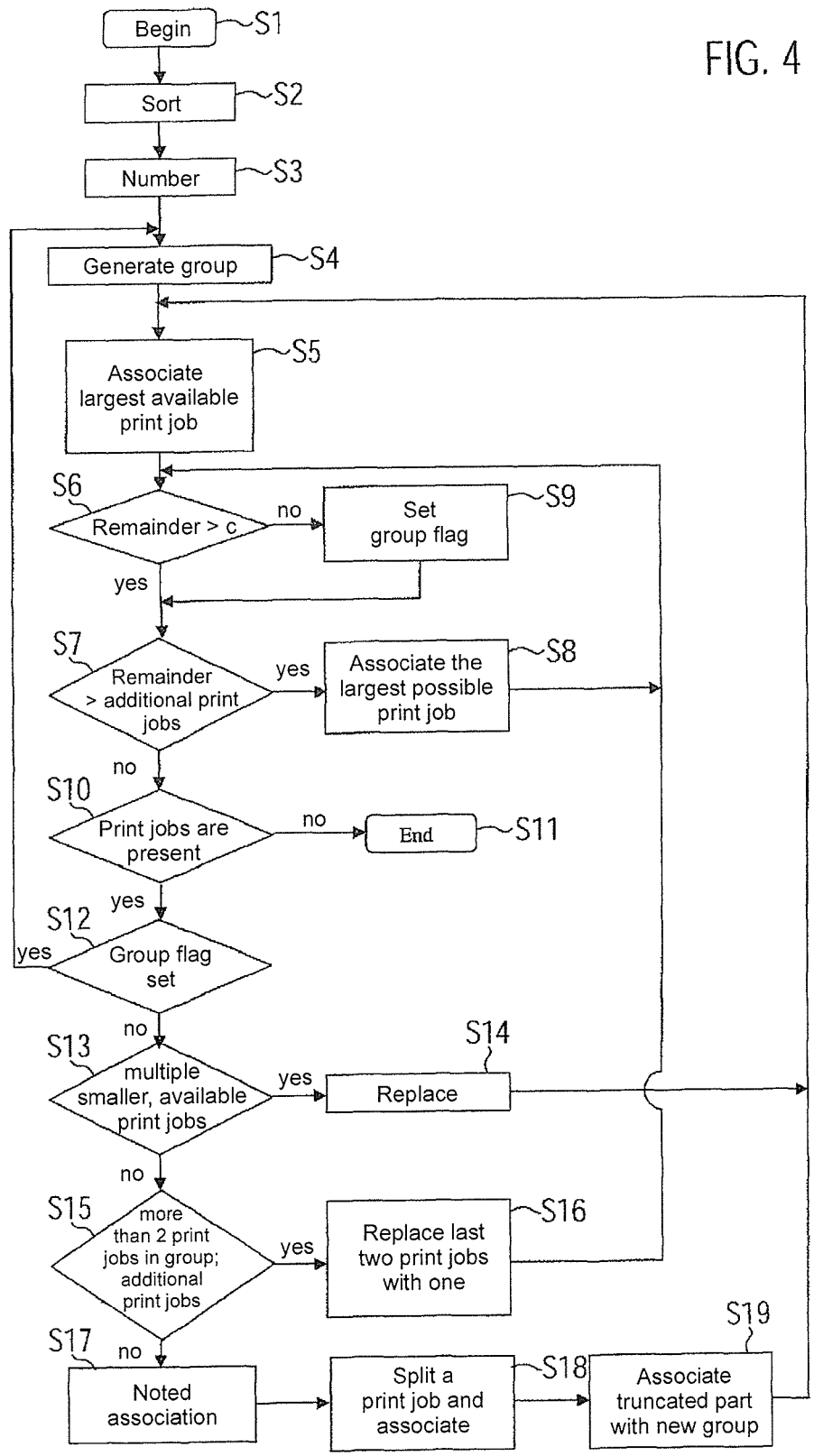
FIG. 4 is a flow diagram of a first embodiment of the method according to the invention.
Figure 5A:
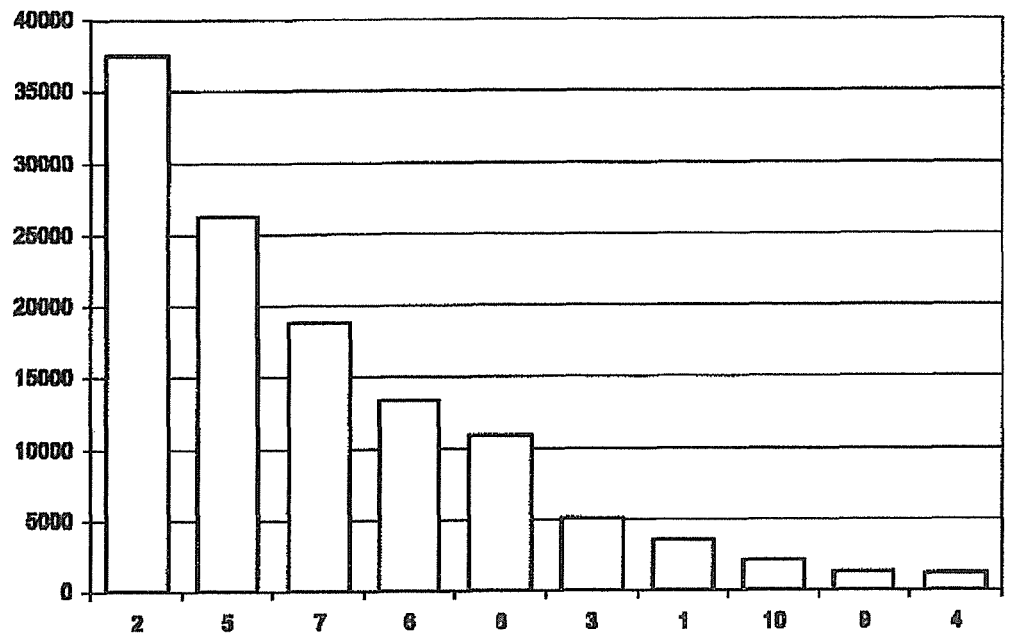
FIG. 5A, 5B show the print jobs according to FIG. 2, sorted or renumbered.
Figure 5B:
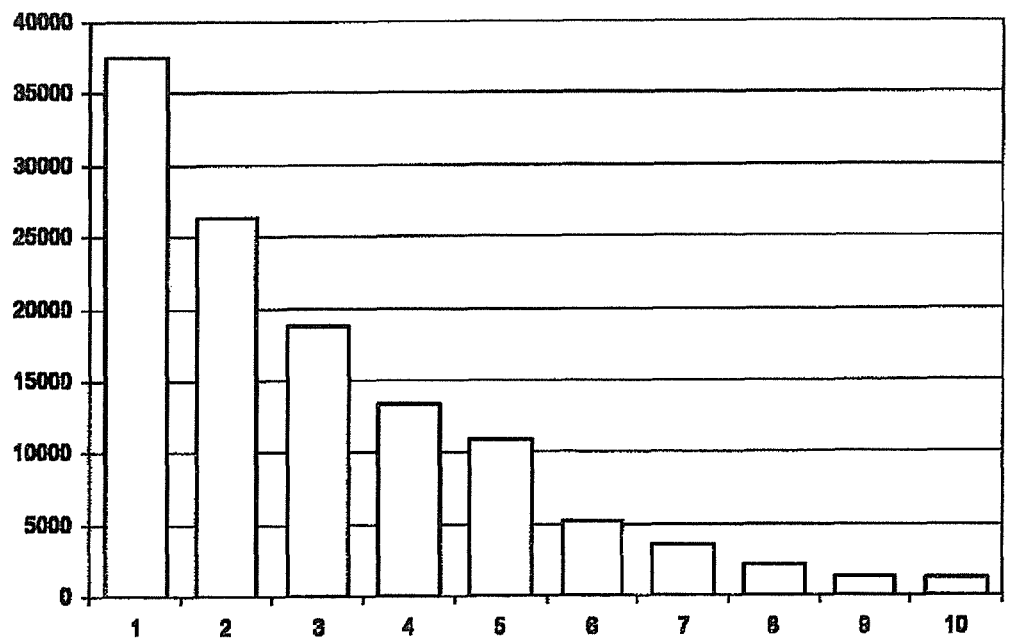

A heuristic method to optimize the workflow of the print jobs is explained in the following. A flow diagram of the method is shown in FIG. 4. This method begins with Step S1. In Step S2 the print jobs are sorted according to their size. The order shown in FIG. 5a results given the print jobs presented in FIG. 2.

The sorted print jobs are renumbered according to size (FIG. 5B) in Step S3. The individual print jobs are associated with groups, wherein it is sought that the total length of the web segments of the print jobs of each group (which is designated as a group length in the following) advantageously corresponds to the web length or optimally lies in a range between a desired length and the web length, wherein the desired length is smaller by a predetermined threshold c than the web length. The threshold c is defined depending on the paper types and in particular the price.

For this a group is initially generated in Step S4.

The largest available print job is associated with the group in Step S5. What is designated with the expression "available print jobs" are all print jobs that have not yet been associated with a group.

Figure 6:
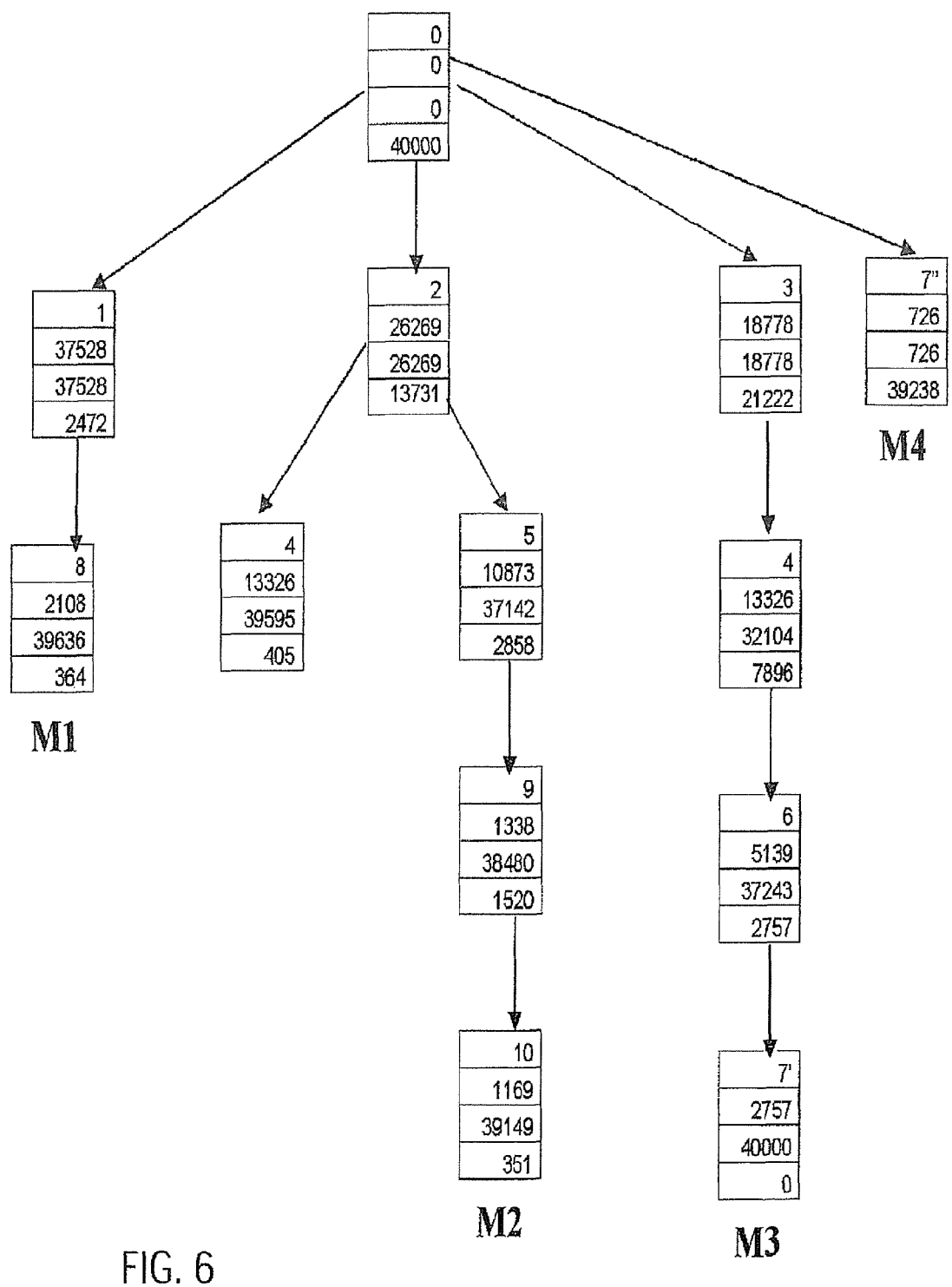
FIG. 6 is a schematic tree diagram to explain the determination of the order of the print jobs shown in FIG. 2.

Since print jobs of a group length that is at most the web length should be associated in each group, in Step S5 the remaining web length available for the accommodation of additional print jobs is calculated in that the web segments of the print jobs (37528, for example) that are associated with the group are subtracted from the web length (40000, for example), whereby a remainder results (2472, for example) (FIG. 6: Node 1).

It is subsequently checked whether the remainder is greater than a maximum remainder c (Step S6). The maximum remainder c typically amounts to a few percent of the web length (1%-10% or 1%-5%, for example). This check corresponds to a check as to whether the print jobs associated with the group have a group length that corresponds to at least one desired length, wherein the desired length is the web length minus the maximum remainder c. If this is the case, the method workflow passes to Step S7, in which it is checked whether print jobs are present that are smaller than the remainder.

If the remainder is greater than additional available print jobs, the largest available print job that is smaller than the remainder is associated with the group (Step S8). The remainder is recalculated in this step.

The method workflow passes from Step S8 to Step S6 so that Steps S6, S7, S8 are repeated if additional available print jobs can be associated with the group.

If the query in Step S6 yields that the remainder is not larger than the maximum remainder c, the method workflow passes to Step S9 in which a group flag is set, which means that the group length of the print jobs contained in the group is longer than the desired length. The method workflow then again passes to Steps S7 and S8 with which additional print jobs can be added to the group.

If it is established in Step S7 that the remainder is not greater than at least one additional print job of the available print jobs, the method workflow passes to Step S10, in which it is checked whether additional print jobs are present. If no additional print jobs are present, the method is ended in Step S11. In contrast to this, if additional print jobs are present the method workflow passes to Step S12, in which it is checked whether the group flag is set or whether the group length is greater than the desired length. If this is the case, the method passes to Step S4 so that an additional group is generated and the largest available print job is associated with the group in Step S5.

In the event that it is established in Step S12 that the group flag is not set, which means that the group length is not greater than the desired length, the method passes to Step S13 in which it is checked whether multiple available print jobs are present that are smaller than the last print job added to the group. If this is the case, the method workflow passes to Step S14, in which the last print job added to the group is removed from the group and replaced by the next smallest print job.

The method flow passes from Step S14 to Step S5.

In contrast to this, if it is established in Step S13 that at least two print jobs that are smaller than the last print job added to the group are not present, the method workflow passes to Step S15.

In Step S15 it is checked whether the group contains more than two print jobs and whether there are additional print jobs that have not already been associated. If this is the case, the method workflow passes to Step S16. In Step S16 the last two print jobs added to the group are removed from the group, wherein the next smallest (relative to the larger of the two removed print jobs) print job is added to the group. In step S16 the removed print jobs are also noted. The method workflow passes from Step S16 to Step S6.

Via a repeated execution of Step S16 the association of the print jobs with a group can be canceled step by step and replaced by a re-association. The association with which the largest group length has been achieved is hereby respectively noted.

If it is established in Step S15 that no more than two print jobs are present in the group, the method workflow passes to Step S17, with which the noted association(s) of print jobs with the longest group length are associated with the group again.

Since this group length is still smaller than the desired length, in Step S18 the largest print job not yet associated with a group is associated with the group, wherein the remainder extending beyond the web length is truncated.

This remainder as a first print job is associated with a new group in Step S19. The method workflow passes from Step S19 to Step S5.

The method shown in FIG. 4 is explained in the following as an example using the ten print jobs shown in FIG. 2. For this a tree diagram that has multiple nodes is shown in FIG. 6. The most important data are indicated as follows at each node:

Number
Size
Sum
Remainder

The number is the number of the print job that is added to the respective node of the group. The origin node contains the number 0 since here the group is still free of print jobs. The size is respectively the size of the print job associated with the respective node. The sum is the sum of the variables of all print jobs associated with the group. The remainder is the difference from the web length minus the sum of the print jobs. At the output node the size and the sum are 0 and the remainder is 40000, which corresponds to the entire web length (FIG. 6).

After the sorting and numbering of the print jobs (S2, S3) a first group is generated (S4) and the largest available print job is associated with the group (S5). This is the print job A1. The print job A1 has a size of 37528. The remainder is thus 2472.

In this example the maximum remainder is c=400. Since the remainder of 2472 is greater than 400, the method workflow passes from Step S6 directly to Step S7, in which it is established that print jobs that are smaller than the remainder are still available. In Step S8 the next largest available print job is added to the group, namely the print job A8 with the size 2108. The remainder of 364 that hereby results is smaller than the maximum remainder c of 400, whereupon the method workflow in Step S6 branches to Step S9 and the group flag is set.

In Step S7 it is checked whether the remainder of the group is greater than additional available print jobs. This is not the case, whereupon the method workflow branches to Step S10, in which it is checked whether additional print jobs are present. This is the case, which is why it is checked in Step S12 whether the group flag is set. Since the group flag is set, the method workflow passes to Step S4, in which a new group is opened. The largest available print job is associated with the new group (S5; node 2 in FIG. 6). The remainder is 13731, which is larger than the maximum remainder of 400 and larger than additional available print jobs (Step S6, S7), whereby in Step S8 the largest possible print job that is smaller than the remainder is associated. This is the print job A4. A remainder of 405 thus results.

In Step S6 it is established that this remainder is greater than the maximum remainder c, whereby the method directly passes again to Step S7, in which it is established that the remainder of 405 is not greater than additional available print jobs. The method workflow hereby branches to Step S10, in which it is checked whether additional print jobs are present. This is the case, which is why it is checked via Steps S12 and S13 whether additional print jobs smaller than the last print job associated with the group are present. The last print job associated with the group was the print job A4. The print jobs A5-A10 are all smaller than the print job A4, whereby the method passes to Step S14, in which the print job A4 is replaced by the next smallest print job (namely the print job A5). This is node 5 in FIG. 6. The remainder is now 2858.

Since, as before, the remainder of 2858 is greater than the maximum remainder and is greater than additional available print jobs, in Step S8 the print job that is the largest print job (relative to the remainder of 2858) of the available print jobs that is still smaller than the remainder is associated with the group.

A remainder of 1520 herewith results at node 8 (FIG. 6). This remainder is in turn larger than the maximum remainder of 400 and greater than additional available print jobs, which is why an additional print job is associated with the group again in Step S8, namely the print job 10. A remainder of 351 hereby results.

Figure 7A:
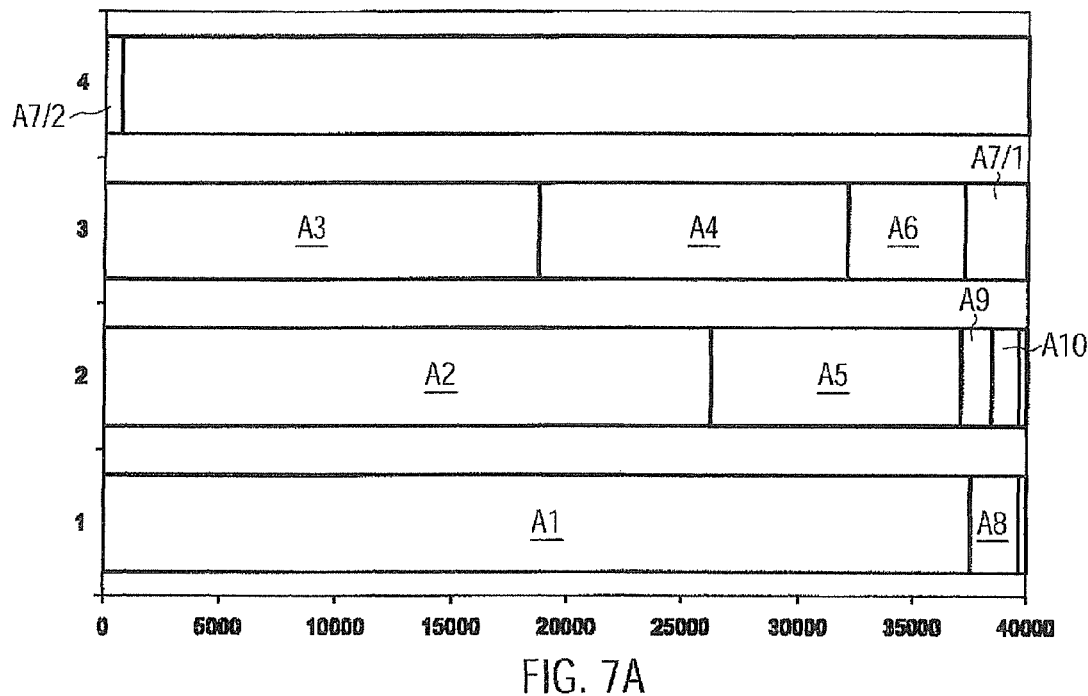
FIG. 7A, 7B illustrate the workflow of the execution of the print jobs shown in FIG. 2 with two different orders.

Because the remainder of 351 is smaller than the maximum remainder of 400, the method branches to Step S9 in which the group flag is set. In Step S7 it is established that no additional print jobs are present that are smaller than the remainder of 351. The method workflow hereby passes to Step S10, in which it is checked whether additional print jobs are present and to Step S12 in which the group flag is set. This is the case, which is why the method branches to Step S4 again and a new group is generated. Print jobs—which are designated with M1 and M2 in FIG. 6 and are shown in FIG. 7A—are thus already associated with two groups.

In the generation of the group M2, the already generated association with the print job A4 was reset and replaced by a new association with the print jobs A5, A8 and A10. The present method thus contains a backtracking method (backtracking).

In the third group the print jobs A3, A4 and A6 are inserted, whereby a remainder of 2757 results. Since this remainder is greater than the maximum remainder of 400 (S6) and the remainder is not greater than additional print jobs (S7), but additional print jobs are present (S10) and the group flag is not set (S12), in Step S13 it is checked whether more small print jobs than the last set print job are present. The method passes to Step S15, in which it is checked whether more than two print jobs are present in the group and whether there are additional print jobs that are not already associated. The latter is not the case, which is why the method step passes to Step S17, in which nothing is executed since no additional print jobs are noted. In method Step S18 the print job A7 is divided into two parts, wherein one part corresponds to exactly the length of the remainder of 2757 and is associated with the group. The other part is then associated with a new group in Step S19. Since no additional print jobs are present, the method in Step S7 branches to Step S10 and from there to Step S11, with which it is ended. Due to the low number of print jobs, the possibility of optimization via the method according to the invention is limited. However, even this example shows that the input rolls and the output rolls can be exchanged simultaneously according to two groups (namely the group M1 and M2), whereby the halt times are spared.

In this example (FIG. 7A), by means of the formula $$G4 \times E + 10 \times A - 2 \times A$$

a total downtime of the printing device of 70 minutes results since the output rolls are exchanged simultaneously with the input rolls twice (with E=10 min and A=5 min). A spoilage of only 715 clicks is generated. The unused 39,238 clicks of the fourth input roll can be used for additional print jobs. This remaining length is advantageously used as a web length for the first group used in the determination of an additional order of print jobs.

Figure 7B:
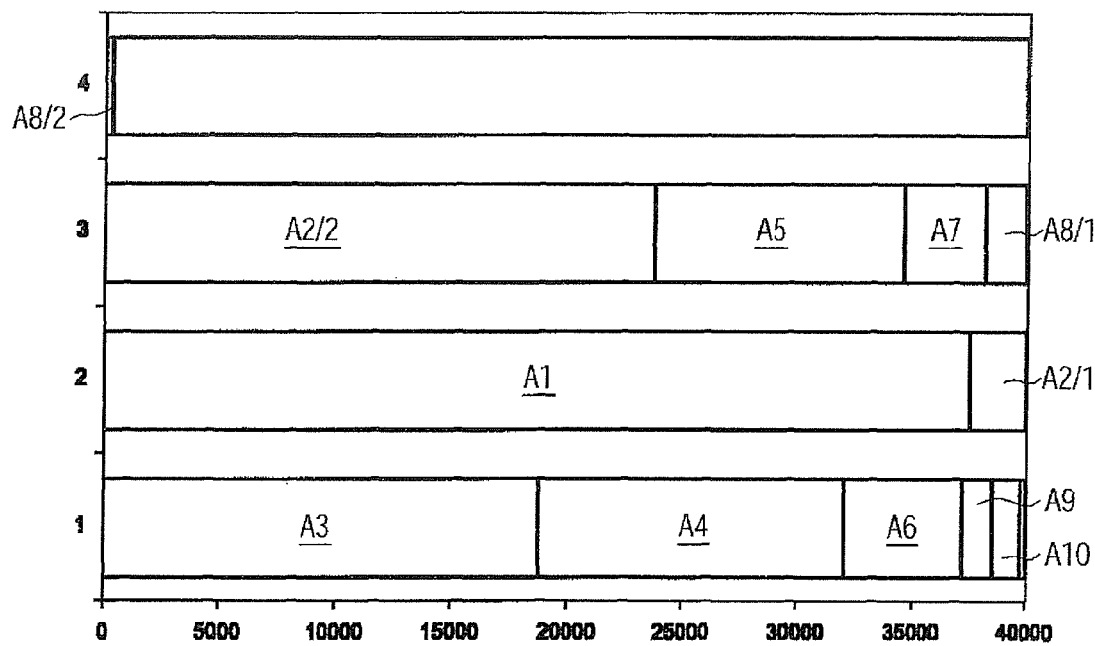

Given only 10 print jobs it is also possible to determine the optimum or the unconsumed material. This optimum is shown in FIG. 7b. Given more print jobs this is no longer possible in practice since the calculations are too complicated.

Figure 11:
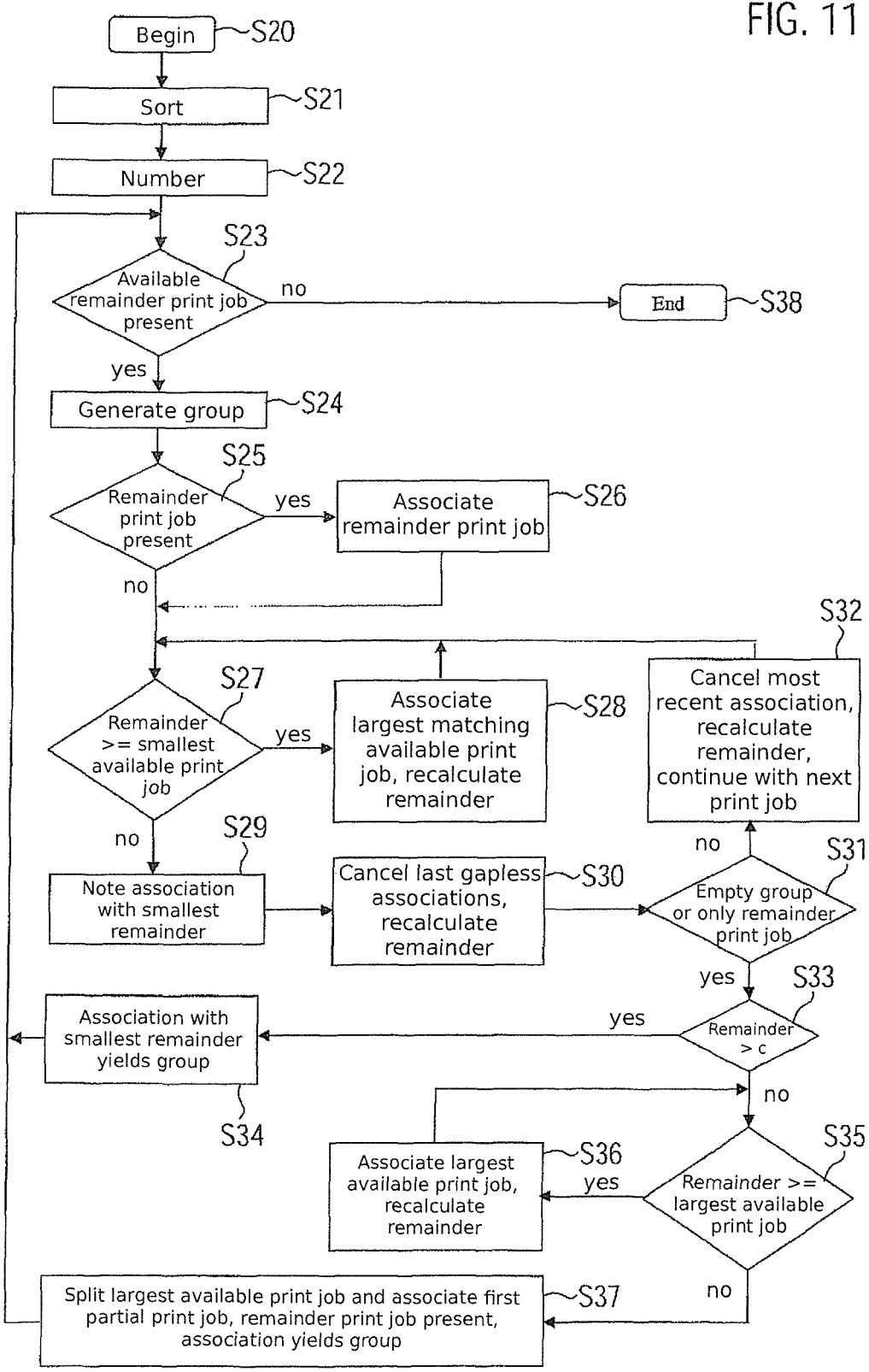
FIG. 11 shows a flow diagram of a second embodiment of the method according to the invention.

An alternative heuristic method for optimization of the workflow of the print jobs is explained using FIG. 11. This method is shown in FIG. 11 in the form of a flow diagram.

This method begins with Step S20. In Step S21 the print jobs are sorted according to their size. In Step S22 the sorted print jobs are renumbered according to their size. Up to this point this alternative method coincides with the method shown in FIG. 4.

In Step S23 it is checked whether available print jobs and/or remainder print jobs are present. What are designated as remainder print jobs are print jobs that arise due to splitting of a print job, for example as in Step S18 in the method explained above. If it is established in Step S23 that at least one available print job and/or one remainder print job is present, a group is generated in Step S24.

In Step S25 it is checked whether a remainder print job is present. In the event that a remainder print job is present, this is associated with the group in Step S26. It is hereby ensured that this remainder print job is executed as a first print job of this group.

After Step S26 the method workflow passes to Step S27. The method workflow also passes to Step S27 if it is established in Step S25 that no remainder print job is present. In Step S27 it is checked whether a remainder is greater than or equal to the smallest available print job. The length that results from the web length minus the web segments of the print jobs that are associated with the respective group is designated as a remainder.

In the event that the remainder is greater than or equal to the smallest available print job, in Step S28 the largest matching, available print job is associated with the group. What is designated as the largest matching, available print job is that print job of the set of available print jobs that is smaller than or equal to the largest remainder. In Step S28, after the association of the largest matching, available print job the remainder is recalculated. The method workflow the passes to Step S27 again in order to check whether an additional available print job is present that can be associated with the group.

If it is established in Step S27 that the remainder is smaller than the smallest available print job, the method workflow passes to Step S29 in which the association with the smallest remainder is noted. This means that the print jobs associated with the group represent an association that has a defined remainder. In the event that other print jobs have already been previously associated with this group, the remainder of the current association is then compared with the remainder of the previously stored association. The association with the smaller remainder is stored as the association with the smallest remainder.

The method workflow now passes to Step S30. In Step S30 the last gapless series of the individual print jobs at the group is canceled. What is to be understood as gapless series are print jobs that are arranged in immediate succession after the sorting (S21) and after the numbering (S22) and are associated with the group in this sequence. The remainder is recalculated in Step S30 after the revocation of the gapless series.

In Step S31 it is checked whether the group is empty or comprises only a remainder print job.

In the event that this is not the case, the method workflow passes to Step S32, in which the association of the last associated print job is canceled and the remainder is recalculated. The next smallest print job relative to the print job whose association has been canceled is associated with the group. The method workflow passes to Step S27 so that an additional series of print jobs can be associated with the group with Steps S27 and S28.

In contrast to this, if it is established in Step S31 that the group is empty or comprises only the remainder print job, the method workflow passes to Step S33. In Step S33 it is checked whether the previously determined association with smallest remainder is smaller than the maximum remainder c.

In the event that the smallest remainder is smaller than the maximum remainder c, in Step S34 the association with the smallest remainder is finally associated with the group and the associated print jobs are noted as unavailable print jobs. The method workflow then passes to Step S23 so that an additional group can be generated in Step S24 in the event that additional print jobs should be present.

In the event that it is established in Step S33 that the smallest remainder is not smaller than the maximum remainder c, this means that no print jobs with a group length that corresponds to at least the desired length could be associated with the group length. The method workflow then passes to Step S35, in which it is checked whether the remainder of the group is greater than or equal to the largest available print job. In the first call of Step S35 this is certainly the case because in Step S31 it has already been checked whether the group is empty or contains only the remainder print job.

In Step S36 the largest available print job is associated with the group and the remainder is recalculated. The method workflow then passes again to Step S35. Via repeated execution of Steps S35 and S36 the largest available print jobs are successively associated with the group until in Step S35 it is established that the remainder is not greater than or equal to the largest available print job. The method then passes to Step S37, in which the largest available print job is divided into a first partial processing job and a second partial processing job so that the first partial processing job extends the processing jobs of the group to exactly the group length and the remainder beyond the web length forms the second partial processing job. This second partial processing job is also designated as a remainder print job. The first partial processing job is associated with the group so that the group length corresponds exactly to the web length.

The method workflow then passes to Step S23. Since a remainder print job is present, in Step S24 a new group is generated and the remainder job is associated with the newly generated group by means of Step S25 and Step S26. Additional available print jobs of the group are subsequently associated with the following Steps.

If it results in Step S23 that no available print job and no available remainder print job are present, the method workflow branches to Step S38, in which the method is ended since all print jobs have respectively been associated with a group.

This method differs from the method shown in FIG. 4 in that multiple associations have been calculated for a group, wherein the association with the smallest remainder is respectively noted. This means that, in the tree diagram presented in FIG. 6, multiple branches of this tree diagram are initially determined to determine a group and only the branch with the smallest remainder is associated with the group. The remaining branches are discarded. Multiple branches are determined in turn for the next group and evaluated according to their remainder. The method shown in FIG. 11 thus requires somewhat more computing time but yields more optimal groups.

This method was applied to an additional example with the following 42 print jobs:
11,669, 7,294, 11,783, 19,734, 3,490, 12,416, 4,149, 7,443, 18,402, 19,006, 14,250, 13,517, 3,719, 18,166, 20,606, 1,602, 8,737, 6,265, 10,211, 649, 11,868, 4,132, 17,327, 3,111, 18,698, 11,130, 7,190, 1,361, 2,380, 11,662, 22,954, 5,354, 17,116, 23,153, 21,294, 13,060, 9,412, 22,704, 1,925, 10,331, 8,308 and 21,814

Figure 8A:
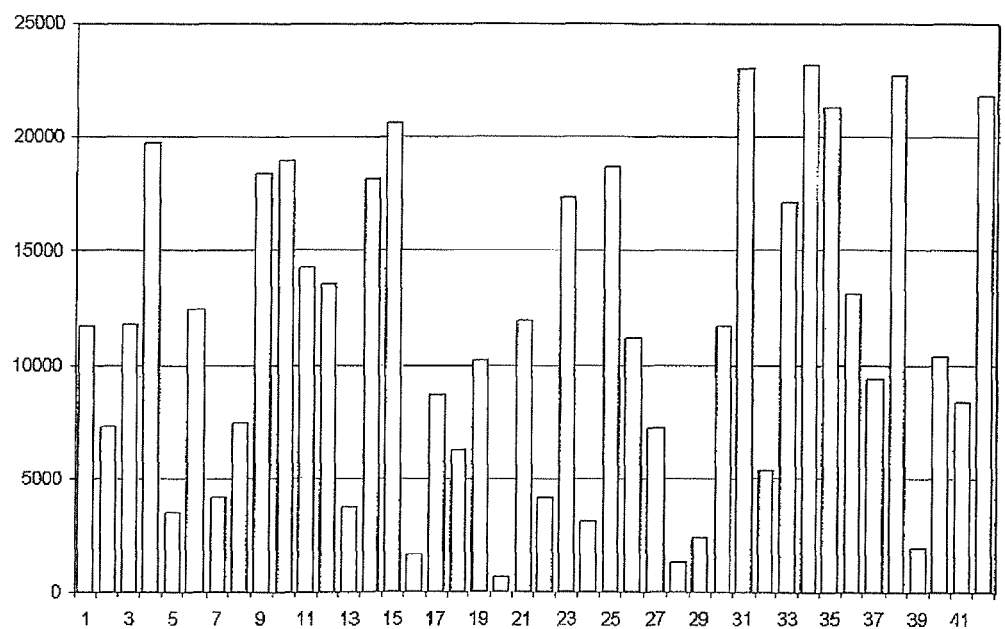
FIG. 8A, 8B illustrate 42 print jobs in a histogram and in a workflow diagram with conventional order.
Figure 8B:
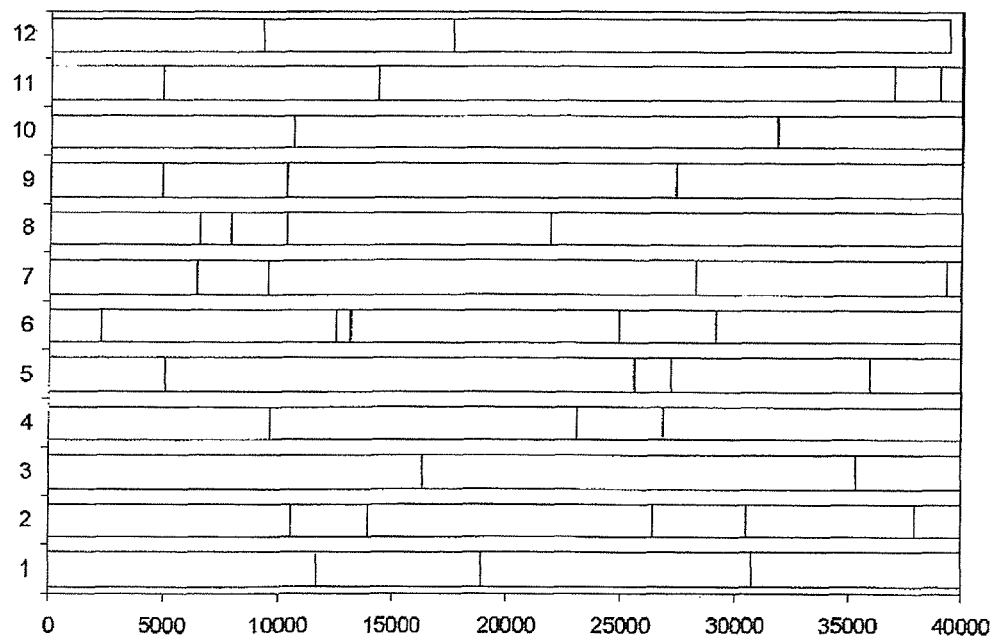

The print jobs are presented in a histogram in FIG. 8A. The sum of all quantities is 479,392, such that at least 12 web lengths of 40,000 clicks are required. If these print jobs are distributed in their natural order to the groups, the workflow shown in FIG. 8B is obtained. A print job is split at each end of a group.

Figure 9:
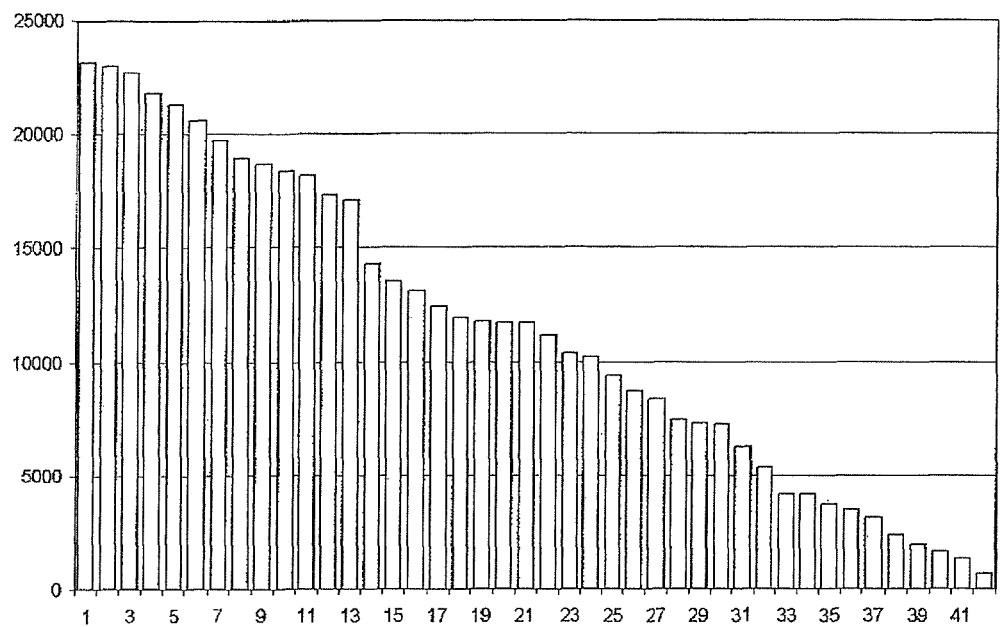
FIG. 9 shows the print jobs from FIG. 8A sorted and renumbered according to size, in a histogram.

In FIG. 9 the print jobs are shown sorted and renumbered according to their size.

Figure 10A:
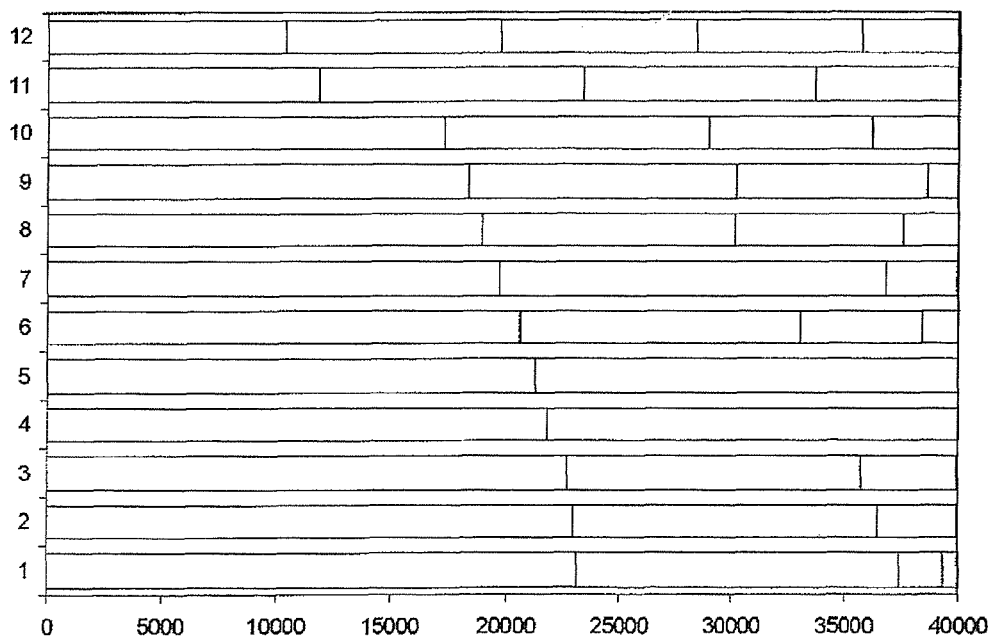
FIG. 10A through 10D respectively illustrates a workflow diagram for the execution of the print jobs from FIG. 9.

When these print jobs are sorted with the method shown in FIG. 11, wherein the maximum remainder c=100, all 42 print job are distributed to the 12 rolls, wherein no print job needs to be divided. Only 608 clicks are discarded (FIG. 10A).

Figure 10B:
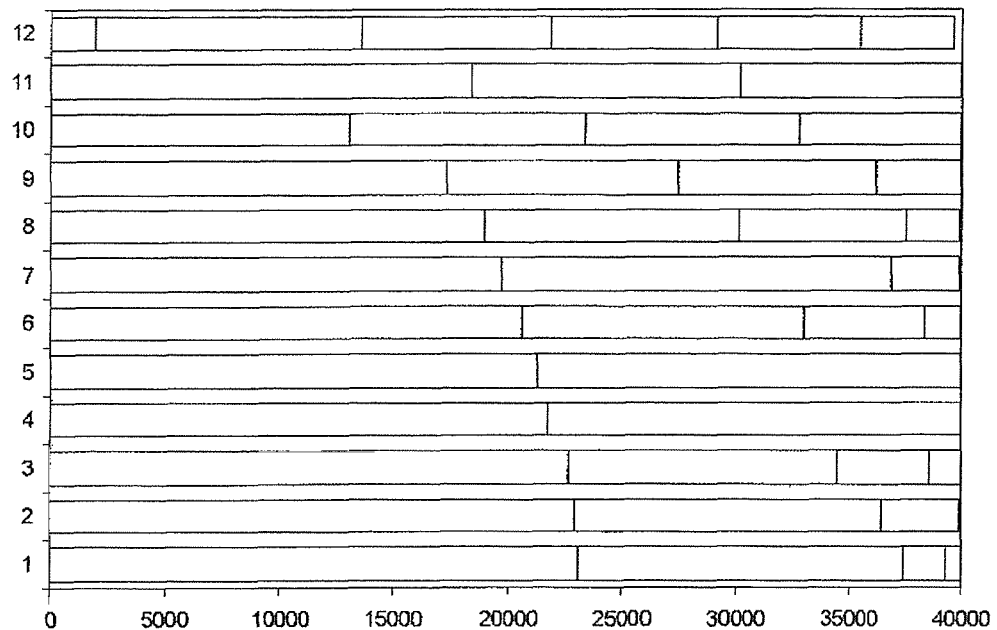

In the same example, if c=50 is selected for the maximum remainder only the last print job of group 11 must be split. 400 clicks remains at the group 12. Otherwise 208 clicks are discarded (FIG. 10B).

Figure 10C:
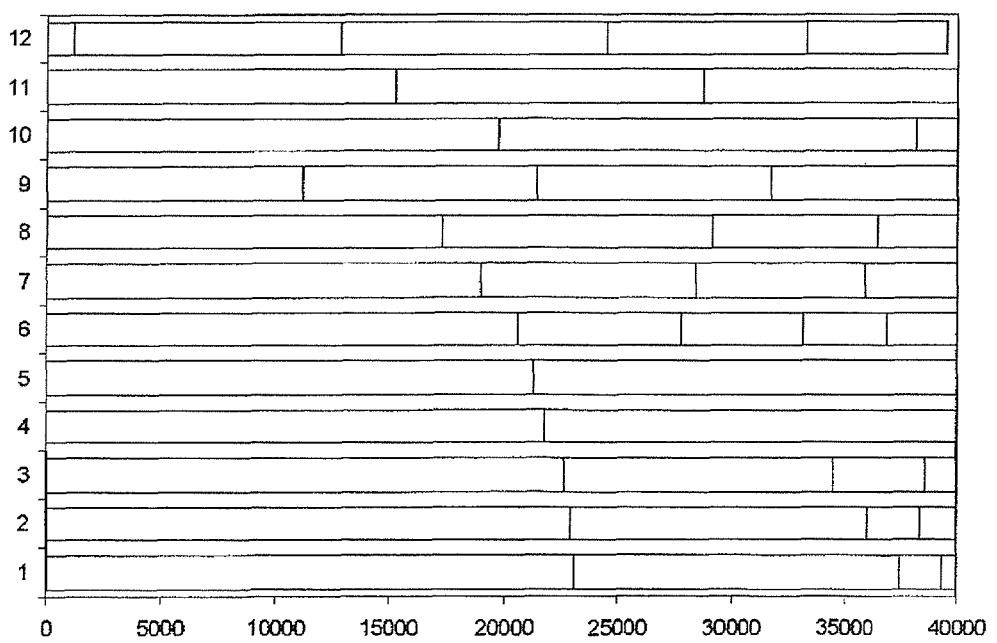
Figure 10D:
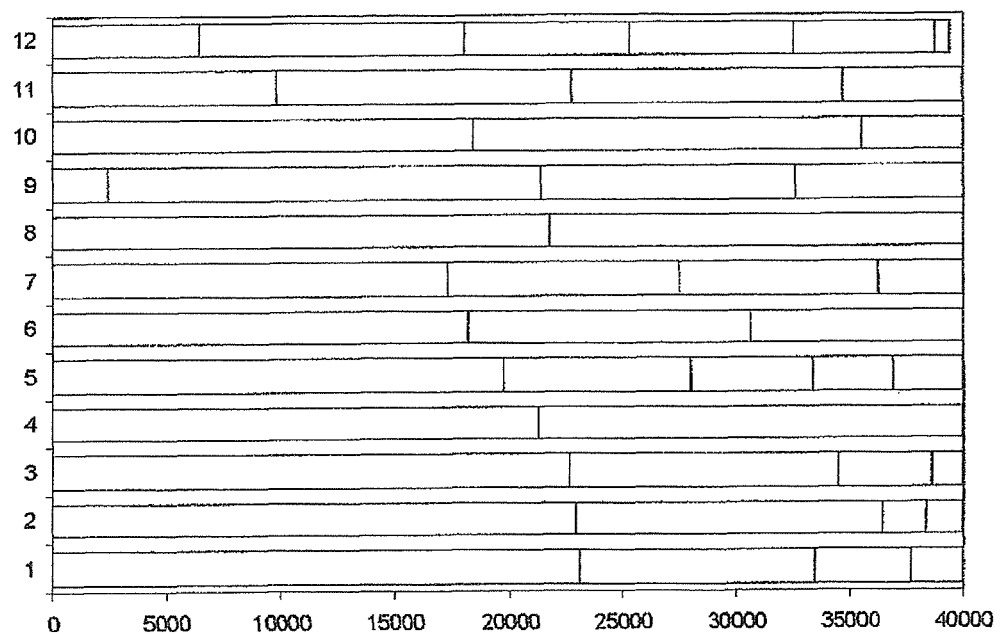

If c=25 is selected for the maximum remainder in the same example, respectively only the last print jobs of the groups 10 and 11 must respectively be split. In the last group 12 482 clicks remain. Otherwise 126 are discarded (FIG. 10C).

If c=10 is selected for the maximum remainder in the same example, respectively only the last print jobs of the groups 8, 10 and 11 must respectively be split. In group 12 575 clicks remain, otherwise 133 are discarded.

This example shows that a significant optimization potential exists given a greater number of print jobs.

In one simulation the method presented in FIG. 11 was applied to 5000 print jobs that were distributed to 1461 or 1462 groups. The size of the print jobs was determined via random numbers. In the table listed below the number of groups, the number of divisions of individual print jobs, the discarded clicks and the required CPU time in seconds given a 2600 MHz CPU are presented for varying maximum remainders c.

| c | Groups | Splittings | Discard | CPU time |
|---|---|---|---|---|
| 25 | 1462 | 0 | 7035 | 3.56 |
| 24 | 1462 | 0 | 6872 | 3.53 |
| 23 | 1462 | 0 | 6888 | 3.54 |
| 22 | 1462 | 1 | 6572 | 3.54 |
| 21 | 1462 | 1 | 6406 | 3.56 |
| 20 | 1462 | 1 | 6342 | 3.54 |
| 19 | 1462 | 0 | 5956 | 3.55 |
| 18 | 1462 | 1 | 6050 | 3.57 |
| 17 | 1462 | 1 | 5756 | 3.76 |
| 16 | 1462 | 1 | 5810 | 3.69 |
| 15 | 1462 | 1 | 5619 | 3.62 |
| 14 | 1462 | 1 | 5386 | 5.23 |
| 13 | 1462 | 0 | 5010 | 3.68 |
| 12 | 1462 | 1 | 4668 | 86.23 |
| 11 | 1462 | 1 | 4569 | 1106.12 |
| 10 | 1462 | 0 | 4259 | 4.29 |
| 9 | 1462 | 0 | 4005 | 3.74 |
| 8 | 1462 | 1 | 3606 | 5.28 |
| 7 | 1462 | 2 | 3284 | 52.35 |
| 6 | 1462 | 4 | 2841 | 2701.30 |
| 5 | 1461 | 5 | 2515 | 5296.78 |
| 4 | 1461 | 2 | 2096 | 25.98 |
| 3 | 1461 | 5 | 1707 | 9.47 |
| 2 | 1461 | 12 | 1175 | 832.28 |
| 1 | 1461 | 14 | 610 | 143.91 |
| 0 | 1461 | 21 | 0 | 1165.89 |

Significant computing time is required for the method for small c since a combination of print jobs for a group that is larger than the desired length and smaller than the web length is found ever more infrequently. Therefore, it can be appropriate to modify the method such that the method is terminated after a certain computing time for a group and a print job is added to the group, which is then split up.

The heuristic method described above is very efficient and can save significant processing time at the printing apparatus, wherein the spoilage of paper is kept low.

The association or sorting of the print jobs can also take place with a different method. For example, the print jobs can be distributed randomly by means of the Monte Carlo method, wherein multiple distributions are evaluated and the order with the best evaluation is selected. The Monte Carlo method is advantageously combined with a heuristic method in which the largest print jobs are initially distributed uniformly to the groups and the multiple distributions of small print jobs that are added to the groups are then generated by means of the Monte Carlo method. Different orders hereby result that are respectively evaluated with a defined cost measure. The cost measure is calculated according to the following formula, for example:

$$G(k*E+n*A-x*A)K+I*M,$$

wherein E is the necessary halt time to exchange the input rolls 11 and A is the necessary halt time to exchange the output rolls 12. K is the number of exchange processes of the input rolls 11 and n is the number of exchange processes of the output rolls 12, and x is the number of the simultaneously executed exchange processes of the input rolls and output rolls. I is the length of the spoilage and K is the cost factor per halt time, and M is the cost factor per length of the spoilage. Given the above formula it is assumed that the exchange of the output rolls can be implemented more quickly than the exchange of the input rolls. However, in the event that the input rolls can be exchanged more quickly than the output rolls, the expression "x*A" is to be replaced by "x*E".

Alternatively, different orders or permutations of the print jobs can also be determined with different methods. For example, a defined order can be generated and print jobs can then be systematically swapped, wherein each order is respectively evaluated with a cost measure G. A lexicographic order (see http://de.wikipedia.org/wik/lexikografische_Ordnung) is advantageously used so that primarily the print jobs at the end of the order are swapped and a completely new order does not always need to be calculated.

Special exemplary embodiments of the method are presented as flow diagrams in FIGS. 4 and 11. However, within the scope of the embodiments it is possible to modify these methods. It is essential that the groups of print jobs are sorted so that the input rolls and the output rolls can be exchanged simultaneously as often at possible with only small spoilage (≤c) at the end of a group.

The embodiments have been described above for a method for sorting print jobs. However, the embodiments are also suitable for all other types of operating methods in which material webs that are supplied and discharged on rolls.

Within the scope of the embodiments, a backtracking method (backtracking) explained above can also be used with a statistical method in which multiple orders are generated that are then evaluated and accordingly selected with a cost measure (the cost measure G stated above, for example).

In above methods processing jobs on rolls are associated with material webs to be supplied and discharged. Within the scope of the embodiments, instead of material webs sheets supplied in predetermined stacks can also be processed.

In the method above groups of print jobs are formed, wherein the groups are assembled solely according to the criterion of the length of the individual print jobs. According to a further embodiment of the present invention, additional or alternative criteria can be used to form the groups.

Figure 12:
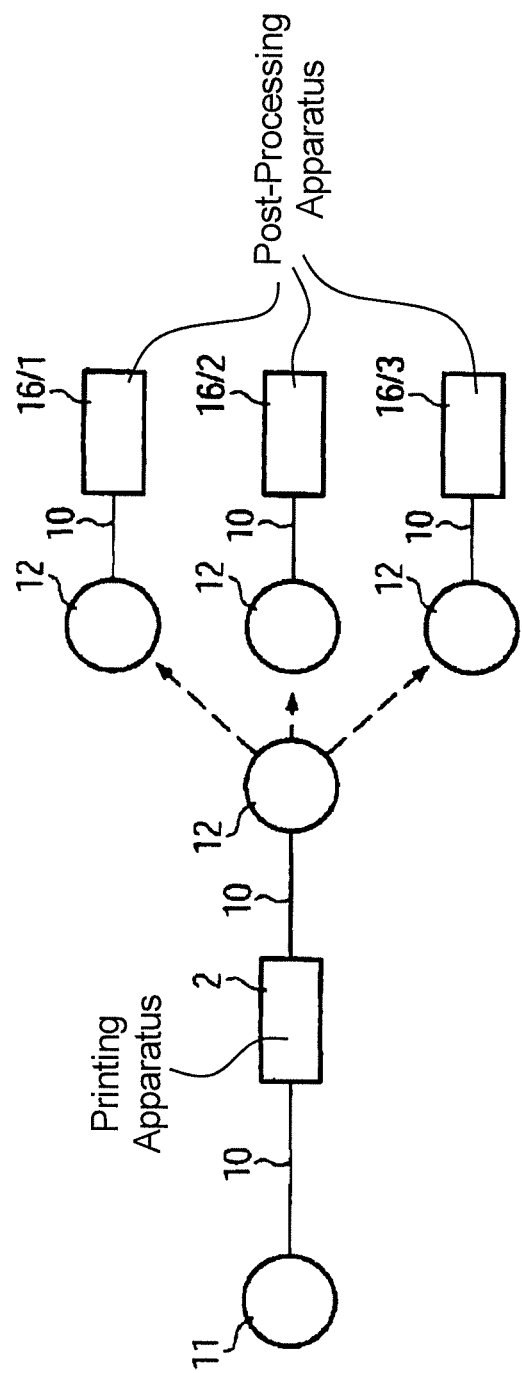
FIG. 12 illustrates schematically the arrangement of a printing system and multiple post-processing systems.

An additional problem in the printing of web-shaped recording materials (in particular web-shaped paper that is supplied to and discharged at a printing apparatus by means of rolls) is explained in the following using FIG. 12.

The web-shaped recording material 10 is supplied to the printing apparatus 2 by means of an input roll 11. The printed recording material is wound on the output roll 12. The printed recording material wound on the output roll 12 is often subjected to a post-processing connected to the printing apparatus. There are different post-processing actions, for example cutting, folding, binding, gluing, enveloping, stitching, stacking and punching. More than one of these post-processing actions are typically also executed in combination, for example cutting, folding and binding. The individual post-processing actions can also be additionally subdivided, for example binding into ring binding and adhesive binding. In principle it is true that the post-processing process is normally smaller than the printing process. Three different post-processing apparatuses 16/1 through 16/3 are schematically depicted in FIG. 12. The post-processing apparatuses 16/1 through 16/3 are arranged in the complete printing system such that they can process parallel recording materials 10 that are respectively drawn from an output roll 12.

The inventors have recognized that the automatic organization of the document processing jobs, in particular print jobs, leads to a significant increase in efficiency in the complete printing system when the post-processing apparatuses 16 are included in the organization of the document processing jobs. This is on the one hand based on the fact that the post-processing apparatuses process the recording material significantly more slowly than the printing apparatuses. Furthermore, post-processing apparatuses require refitting times given a changeover from one specific post-processing process to a different post-processing process. The refitting times can amount to a few minutes but also a few hours. For example, given a format of 9 cm×11 cm a post-processing apparatus for cutting can quickly be refitted to a format of 9 cm×12 cm, for example. Depending on the embodiment of the post-processing apparatus, this takes a few minutes to at most 15 minutes. In contrast to this, if one were to refit a post-processing apparatus from adhesive binding to film binding or ring binding, significantly more time is required here. Typical values are 2 to 3 hours.

The fundamental principle of the automatic organization of the document processing jobs lies in collecting print jobs that should be subject to the same post-processing process into groups so that these print jobs are collected on one output roll, wherein the individual groups of print jobs are sorted such that the post-processing apparatuses 16 are utilized as optimally as possible.

A first criterion for sorting the groups of document processing jobs lies in taking into account post-processing processes connected to the printing apparatus and, depending on the throughput of the respective post-processing process, sorting the groups associated with the individual post-processing process in alternation such that the corresponding post-processing apparatuses are utilized as uniformly as possible.

A second criterion of the sorting of the groups of document processing jobs lies in taking the necessary refitting times into account in the establishment of the order of the groups. This is in particular important in digital high-capacity printing since digital printing is characterized in that a plurality of print jobs with relatively small print volume can be printed without the printing apparatus having to be refitted for this. In digital printing the print volumes are significantly smaller than in offset printing. Small print volumes significantly more often require a refitting at the post-processing apparatuses than large print volumes.

In the following a print server that is designed to execute the automatic sorting of document processing jobs according to the above principle is explained using FIGS. 13 and 14.

The print server 3 is connected via a data line 7 with a super-regional network (WAN, Internet). Computers 15 to generate document processing jobs are connected to the data network 18.

The print server 3 has a distributor module 19 that is connected with multiple memory units 20/1 through 20/4. A routing module 21 that can relay groups of document processing jobs via a data line 4 to a printing apparatus 2 is connected to the memory units 20. The distributor module 19 and the router module 21 are advantageously designed as computer program units.

Figure 14:
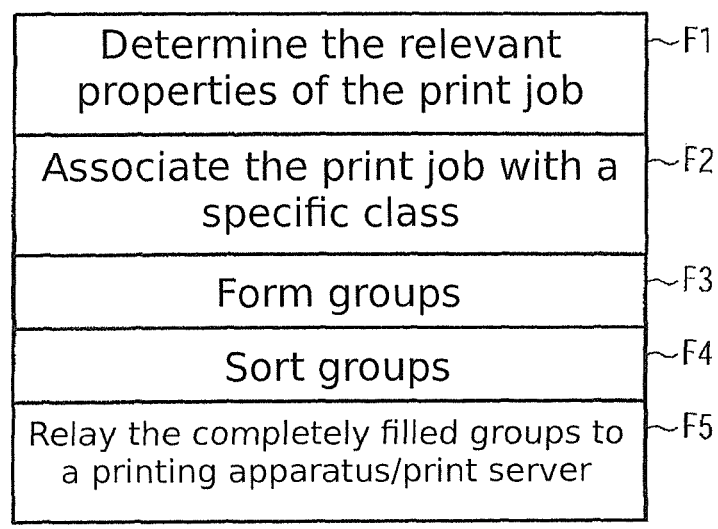
FIG. 14 is a list of computer program elements for automatic classification of print jobs.

A few functions that are executed at the server 3 in multitasking operation are shown in FIG. 14.

Incoming document processing jobs are examined for predetermined, relevant properties by means of the function F1 at the distributor module 19. The individual document processing jobs should be classified. The relevant properties for this classification are extracted with the function F1. These properties are, for example, the format, the substrate or paper type (environmentally friendly paper, foil, special paper etc.), the color space to be used and/or features of the post-processing process. In addition to the physical features (format or substrate type, for example) and the process-related features (color space, post-processing features), economic features can also be taken into account, for example the fill level of the inventory and shelf lives of the unprinted recording material or the printed products.

With a function F2, the individual document processing jobs or, respectively, print jobs are associated with specific classes using their features. Corresponding to their class association, the document processing jobs are respectively stored by the distributor module 19 in a memory unit 20 that are designed to exclusively receive document processing jobs of a specific class. The document processing jobs stored in the memory units are collected into groups in the function F3. The collection into groups can take place according to the methods explained above, depending on the length of the respective document processing jobs, such that a simultaneous exchange of the input roll and output roll occurs as often as possible.

However, in principle it is also possible to form the groups according to other criteria. In particular, if relatively few document processing jobs are present within a class then the present document processing jobs are collected into a group if together they have a specific minimum length, even if this minimum length is still too small in order to simultaneously exchange the input roll and output roll.

The formed groups are detected and sorted by the distribution module 19 (function F4). The sorting of the groups takes place according to predetermined rules. A few rules are subsequently explained in detail in an example.

Rule 1:

The groups are sorted depending on the throughput of the post-processing apparatuses, wherein the post-processing apparatuses are utilized uniformly with groups of processing jobs, and more groups of document processing jobs are associated with the post-processing apparatuses that have a higher throughput.

Rule 2:

It is examined whether different groups that should be executed at the same post-processing apparatus require a different setting at the post-processing apparatus and therefore require a refitting. If such a refitting is established, similar groups of document processing jobs are sorted successively so that the number of refitting processes is low and, depending on the necessary refitting time, the number of transmitted groups of document processing jobs that are processed by this post-processing apparatus is reduced in order to not cause any backup at this post-processing apparatus.

Rule 3:

The order of the individual groups is determined depending on their content. If a group contains multiple document processing jobs that contain an urgency notation, the priority of the group in the order of the groups is determined depending on the urgency notation and the number of urgency notations.

Rule 4:

The groups of document processing jobs are sorted depending on the inventory of the unprinted recording material and/or of the printed products, wherein (for example) a high inventory of a specific type of recording materials is executed with a high priority, and given a high inventory of a specific product the group of document processing jobs that lead to the generation of the product is sorted with a low priority in the order in order to not unnecessarily increase the inventory.

The groups of document processing jobs sorted in such a manner are relayed by the router mode 21 to the printing apparatus via the data lines 4 (Function F5).

This method can be developed to the effect that the document processing jobs are sorted within each group according to their urgency and/or other criteria.

The rules listed above can be applied with a mathematical exactness. Within the scope of the present embodiments, however, it can also be appropriate to apply the rules with a fuzzy logic.

Figure 13:
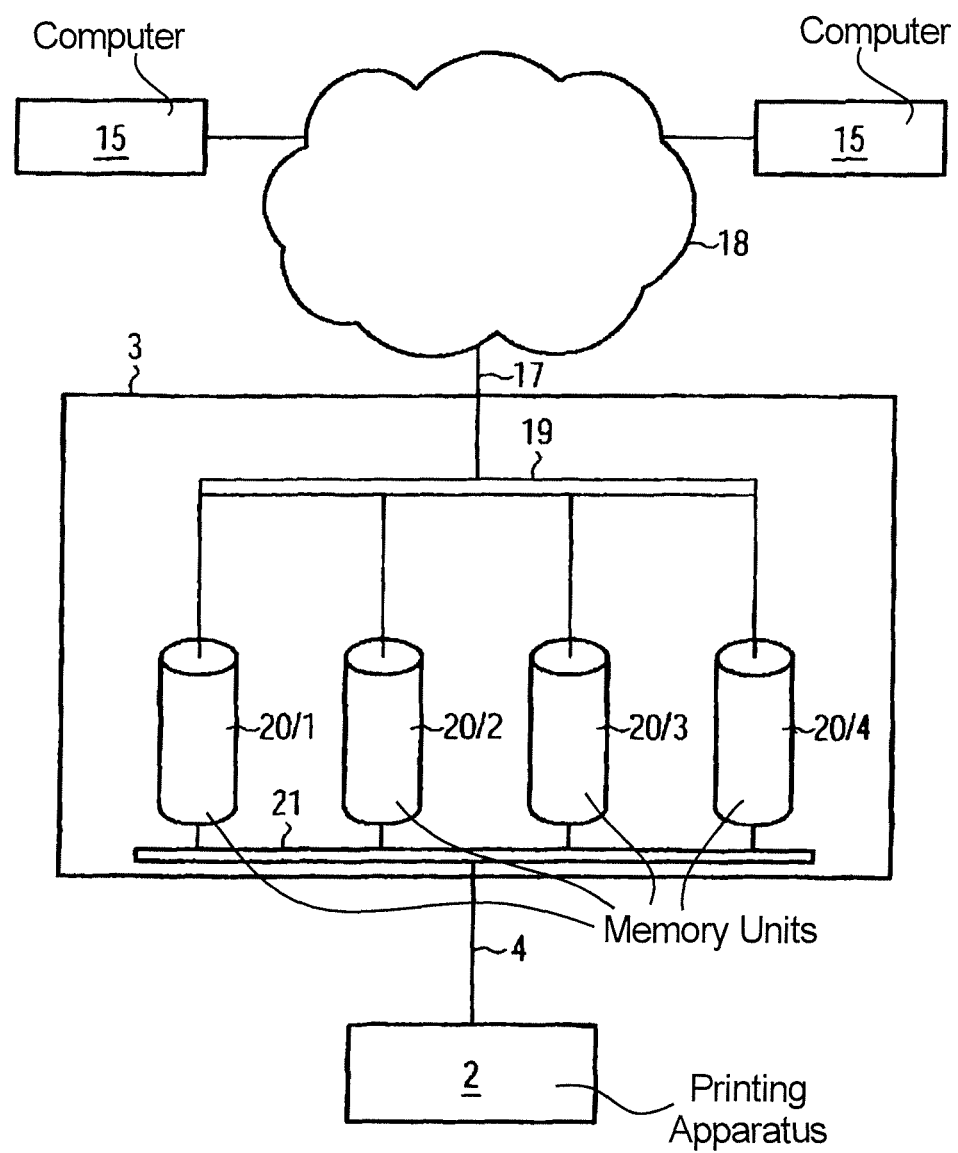
FIG. 13 shows schematically a print server connected with a printing apparatus and logical data lines between the printing apparatus and the print server and the print server and clients.

This method explained using FIG. 13 is primarily appropriate when it is certain in advance which types of document processing jobs arrive at the server 3, such that the individual classes can be established in advance. Depending on the classes, the memory units 20 can then be defined and the relevant properties can be established for sorting of the document processing jobs.

Figure 15:
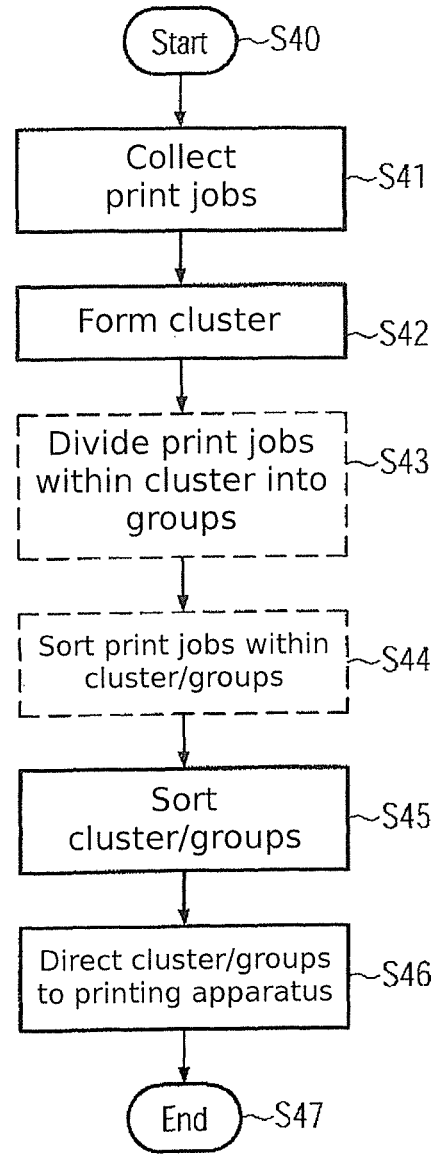
FIG. 15 illustrates a method to automatically classify print jobs by means of clustering in a flow diagram.

However, it is not always possible to establish the classes in advance. An alternative method for sorting the groups is shown in FIG. 15, in which the individual classes do not need to be determined in advance. This method begins with Step S40. In Step S41 a predetermined set of document processing jobs or print jobs is collected.

If a minimum number of document processing jobs is present, a clustering takes place using the properties of the document processing jobs. Document processing jobs that have the same and/or similar properties are hereby assembled in a cluster. These properties are thus not established in advance; rather, the document processing jobs are collected into a cluster in which as many properties as possible coincide or at least are similar, wherein the individual properties can be weighted with different strengths for the clustering.

In Step S43 the document processing jobs or print jobs within the respective clusters are collected into groups, such that a group of document processing jobs can be executed with the recording material of one input roll. The collection of the groups can be executed according to any method explained above, such that the group length corresponds at least to a desired length that is a bit shorter than the web length (according to FIGS. 4 and 11, for example). However, the groups can also be collected according to other criteria.

The document processing jobs are sorted within the group or cluster (Step S44). This sorting primarily takes place according to a predetermined urgency criteria that are contained in the document processing jobs.

The groups or clusters are sorted (Step S45), wherein the rules applied in the method explained above using FIG. 14 are also applied here. The sorting can take place using a single rule or also a combination of multiple rules.

The groups or clusters are relayed to the printing apparatus in Step S46. The method is ended with Step S47.

The method steps S43 and S44 are optional, meaning that the method can also be executed without these two method Steps. If no groups are formed, the clusters are sorted in Step S45 and in Step S46 the clusters are relayed to the printing apparatus. This is primarily appropriate when the size of the cluster is smaller than the web length of the recording material of an input roll. The clusters thus directly form a respective group.

The halt times—in particular at the post-processing apparatuses—are reduced via this automatic clustering and the sorting of the clusters or the groups formed from these, and the utilization of the complete printing system is improved.

Although the preferred embodiments were explained using an electrophotographic digital printing system, it is clear that they can also be used with printing systems of other recording technologies, with document processing systems in general and with systems for the execution of processing jobs of an entirely different type. In particular, it is usable with other digital printing systems—for example with inkjet printing systems, with magnetographic systems or with electrographic liquid developer printing systems—and also with offset printing systems, for example.

Although preferred exemplary embodiments are shown and described in detail in the drawings and in the preceding specification, they should be viewed purely as an example and not as limiting the invention. It is noted that only the preferred exemplary embodiments are presented and described, and all variations and modifications that presently and in the future lie within the protective scope of the invention should be protected.

We claim as our invention:

1. A method for automatic controlling of jobs to be processed, said jobs to be associated with input and output material bundles, comprising the steps of:
    collecting the jobs to be processed into multiple groups or clusters;
    automatically sorting the groups or clusters according to rules;
    feeding the input material bundles to a processing device at a central station, a plurality of post-processing apparatuses being connected to and downstream from said processing device;
    the material bundles being of predetermined bundle processing length, the jobs being processed being distributed to multiple material bundles, and before and during the processing the material bundles being supplied by means of the input bundles to the processing device, individual processing jobs segments of different length being processed, and the processed segments of the material bundle being collected into the output bundles;
    before the processing the jobs to be processed being collected into said multiple groups so that a total length of the segments of the jobs to be processed of each group designated as a group length lies in a range between a desired length and the bundle processing length for multiple groups, the desired length being smaller by a predetermined threshold than the bundle processing length, and, given a group for which no group length can be determined in a range between the desired length and the bundle processing length, an additional job to be processed being subdivided into a first and a second partial processing job such that the segment of the first partial job to be processed corresponds to a difference from the processing bundle length and the group length and is added to the group as a last job to be processed, and the second partial job to be processed being added to an additional group as a first job to be processed that is executed following the group with the first partial job to be processed; and
    the jobs to be processed of each group being executed in succession, and given group lengths whose length amounts to at least the desired length, the input bundle with which the material bundle has been supplied to process these jobs to be processed and the output bundle in which the processed material bundle is collected being exchanged simultaneously.

2. The method according to claim 1 wherein multiple associations of jobs to be processed are determined for a group, and a remainder of the bundle processing length minus the group length is calculated for each association, wherein the association is associated with a smallest remainder of the group when the group length is between the desired length and the bundle processing length.

3. The method according to claim 2 wherein the multiple associations are determined in that, after the determination of an association of document jobs to be processed, a last gapless sequence of the document jobs to be processed of the association is canceled and a new association is determined provided that additional suitable document jobs to be processed are present.

4. A method for automatic controlling of jobs to be processed, said jobs to be associated with input and output material bundles, comprising the steps of:

collecting the jobs to be processed into multiple groups or clusters;

automatically sorting the groups or clusters according to rules;

feeding the input material bundles to a processing device at a central station, a plurality of post-processing apparatuses being connected to and downstream from said processing device; and before the formation of groups the jobs to be processed being sorted automatically into predetermined classes using relevant properties, the groups being respectively formed within the respective classes, and each of the jobs to be processed being subjected to the following steps for sorting into classes extracting properties relevant to sorting into classes comprising at least one of the properties format, substrate or paper type, color space for use, features of post-processing process and/or economic features, and shelf lives of unprinted recording material or printed products, and associating the document jobs to be processed with respective classes corresponding to the extracted properties.

5. A method for automatic controlling of jobs to be processed, said jobs to be associated with input and output material bundles, comprising the steps of:

collecting the jobs to be processed into multiple groups or clusters;

automatically sorting the groups or clusters according to rules;

feeding the input material bundles to a processing device at a central station, a plurality of post-processing apparatuses being connected to and downstream from said processing device; and before the formation of the groups the jobs to be processed being automatically collected into clusters using the same or at least similar properties of the jobs to be processed, and the groups being respectively formed within the respective clusters, wherein relevant properties are format, substrate or paper type, color space to be used, features of post-processing process and/or economic features, and shelf lives of unprinted recording material or printed products.

6. A method for automatic controlling of jobs to be processed, said jobs to be associated with input and output material bundles, comprising the steps of:

collecting the jobs to be processed into multiple groups or clusters;

automatically sorting the groups or clusters according to rules;

feeding the input material bundles to a processing device at a central station, a plurality of post-processing apparatuses being connected to and downstream from said processing device;

the following steps being executed to collect the material bundles into groups sort the jobs to be processed according to their size, select largest available jobs to be processed and associate these jobs to be processed with a group, add the largest available job to be processed that still fits on a material web to the group, repeat the preceding step until no additional job to be processed that can be associated with the group is available, wherein a group length is not greater than a web length, and check whether the group length is greater than or equal to a desired length and, if this is the case, an additional group of jobs to be processed is generated according to the first four steps in the event that jobs to be processed are still present that are not associated with any group; and in the event that the group length is smaller than the desired length, one or more jobs to be processed are removed from the group and replaced by multiple jobs to be processed that are all smaller than the longest removed job to be processed wherein upon removal of a job to be processed from the group, the following steps are executed when the group length is smaller than the desired length remove the last two associated jobs to be processed, add a next smallest job to be processed relative to a largest of the two removed jobs to be processed, check whether free jobs to be processed can still be added to the group so that they still fit on a material bundle, wherein if this is possible a next largest free job to be processed is added, and if this is not possible then the first four steps are repeated, and subdividing a job to be processed if it is established in the first step that no smaller jobs to be processed are present.

7. The method according to claim 6 wherein different sets of groups are generated by means of a Monte Carlo method, and for each set of groups a cost measurement is calculated and the set with the lowest cost measurement is selected.

8. The method according to claim 6 wherein different sets of groups are generated by means of systematic exchange of the order, and for each set of groups a cost measurement is calculated, and the set with the lowest cost measurement is selected.

9. A non-transitory, tangible computer readable medium having a computer program embodied thereon for automatic controlling of jobs to be processed, said jobs to be associated with input and output material bundles, said program performing the steps of:

collecting the jobs to be processed into multiple groups or clusters;

automatically sorting the groups or clusters according to rules;

feeding the input material bundles to a processing device at a central station, a plurality of post-processing apparatuses being connected to and down stream from said processing device;

the material bundles being of predetermined bundle processing length, the jobs being processed being distributed to multiple material bundles, and before and during the processing the material bundles being supplied by means of the input bundles to the processing device, individual processing jobs segments of different length being processed, and the processed segments of the material bundle being collected into the output bundles;

before the job processing the jobs to be processed being collected into said multiple groups so that a total length of the segments of the jobs to be processed of each group designated as a group length lies in a range between a desired length and the bundle processing length for multiple groups, the desired length being smaller by a predetermined threshold than the bundle processing length, and, given a group for which no group length can be determined in a range between the desired length and the bundle processing length, an additional job to be processed being subdivided into a first and a second partial processing job such that the segment of the first partial job to be processed corresponds to a difference from the processing bundle length and the group length and is added to the group as a last job to be processed, and the second partial job to be processed being added to an additional group as a first job to be processed that is executed following the group with the first partial job to be processed; and the jobs to be processed of each group being executed in succession, and given group lengths whose length amounts to at least the desired length, the input bundle with which the material bundle has been supplied to process these jobs to be processed and the output bundle in which the processed material bundle is collected are exchanged simultaneously.

10. A printing system, comprising:

a printing apparatus;

a print server connected with the printing apparatus;

said print server automatically controlling jobs to be processed, said jobs to be associated with input and output material bundles, said print server collecting the jobs to be processed into multiple groups or clusters, automatically sorting the groups or clusters according to rules, and feeding the input material bundles to a processing device at a central station, a plurality of post-processing apparatuses being connected to and downstream from said processing device;

the material bundles being of predetermined bundle processing length, the jobs being processed are distributed to multiple material bundles, and before and during the processing the material bundles being supplied by means of the input bundles to the processing device, individual processing jobs segments of different length being processed, and the processed segments of the material bundle being collected into the output bundles;

the jobs to be processed being collected into said multiple groups so that a total length of the segments of the jobs to be processed of each group designated as a group length lies in a range between a desired length and the bundle processing length for multiple groups, the desired length being smaller by a predetermined threshold than the bundle processing length, and, given a group for which no group length can be determined in a range between the desired length and the bundle processing length, an additional job to be processed being subdivided into a first and a second partial processing job such that the segment of the first partial job to be processed corresponds to a difference from the processing bundle length and the group length and being added to the group as a last job to be processed, and the second partial job to be processed being added to an additional group as a first job to be processed that is executed following the group with the first partial job to be processed; and the jobs to be processed of each group being executed in succession, and given group lengths whose length amounts to at least the desired length, the input bundle with which the material bundle has been supplied to process these jobs to be processed and the output bundle in which the processed material bundle is collected being exchanged simultaneously.

* * * * *